United States Patent [19]

Asaida et al.

[11] Patent Number: 5,521,637
[45] Date of Patent: May 28, 1996

[54] SOLID STATE IMAGE PICK-UP APPARATUS FOR CONVERTING THE DATA CLOCK RATE OF THE GENERATED PICTURE DATA SIGNALS

[75] Inventors: Takashi Asaida; Jun Hattori, both of Kanagawa, Japan

[73] Assignee: Sony Corporation, Tokyo, Japan

[21] Appl. No.: 503,424

[22] Filed: Jul. 17, 1995

Related U.S. Application Data

[63] Continuation of Ser. No. 133,296, Oct. 8, 1993, abandoned.

[30] Foreign Application Priority Data

Oct. 9, 1992 [JP] Japan .................................. 4-297766

[51] Int. Cl.$^6$ .................................................. H04N 5/228
[52] U.S. Cl. ........................ 348/222; 348/272; 348/265; 348/492; 348/71
[58] Field of Search ............................ 348/71, 265, 272, 348/492, 222, 266, 392, 494; H04N 9/04, 7/18, 9/09, 3/14, 5/335, 9/083, 11/12, 5/228, 9/07, 7/12, 11/02, 11/04

[56] References Cited

U.S. PATENT DOCUMENTS

| | | | |
|---|---|---|---|
| 4,870,661 | 9/1989 | Yamada et al. | 341/61 |
| 5,043,798 | 8/1991 | Emori | 348/392 |
| 5,136,379 | 8/1992 | Ishii | 348/392 |
| 5,272,524 | 12/1993 | Nagumo et al. | 358/41 |
| 5,359,428 | 10/1994 | Kubota et al. | 358/335 |

FOREIGN PATENT DOCUMENTS

| | | |
|---|---|---|
| 0420612 | 4/1991 | European Pat. Off. . |
| 0520759 | 12/1992 | European Pat. Off. . |
| 2069795 | 8/1981 | United Kingdom . |

OTHER PUBLICATIONS

SMPTE Journal, vol. 100, No. 1, Jan. 1991, U.S., pp. 19–22 "A complete post–production system for all video formats."

*Primary Examiner*—Safet Metjahic
*Assistant Examiner*—Nina M. West
*Attorney, Agent, or Firm*—William S. Frommer; Alvin Sinderbrand

[57] ABSTRACT

A solid-state image pickup apparatus for generating image pickup signals produced by a solid-state image sensor. The image sensor is driven at a data rate of $f_{s1}$ with a predetermined phase. Digital luminance signal Y and two digital chrominance signals $C_R$, $C_B$ are generated by a first digital processing unit, operated at a clock rate related to the data rate of $f_{s1}$, from the digitized image pickup signals. These signals are then converted by a second digital processing unit into signals Y, $C_R$ and $C_B$ having a data rate related to $f_{s2}$. The second digital processing unit performs bandwidth limitations on these signals by a half band filter having a passband $f_{s2}$, $f_{s2}/2$ and $f_{s2}/2$ and performs data rate conversion of from $2f_{s1}$ to $f_{s2}$, from $f_{s1}$ to $f_{s2}/2$ or $f_{s2}/4$ and from $f_{s1}$ to $f_{s2}/2$ or $f_{s2}/4$, for outputting the low order linear phase finite impulse response sufficient to suppress high-order sideband components in the vicinity of $n \cdot 2f_{s1}$, $n \cdot f_{s1}$, and $n \cdot f_{s1}$, (n being a positive integer) in a form that can be down-sampled at $f_{s2}$, $f_{s2}/2$ or $f_{s2}/4$ and $f_{s2}/2$ or $f_{s2}/4$. The second digital processing unit can have a simplified construction when the characteristics of the half band filter are used to compensate for the band pass rollover characteristics of the rate-converting filter.

35 Claims, 19 Drawing Sheets

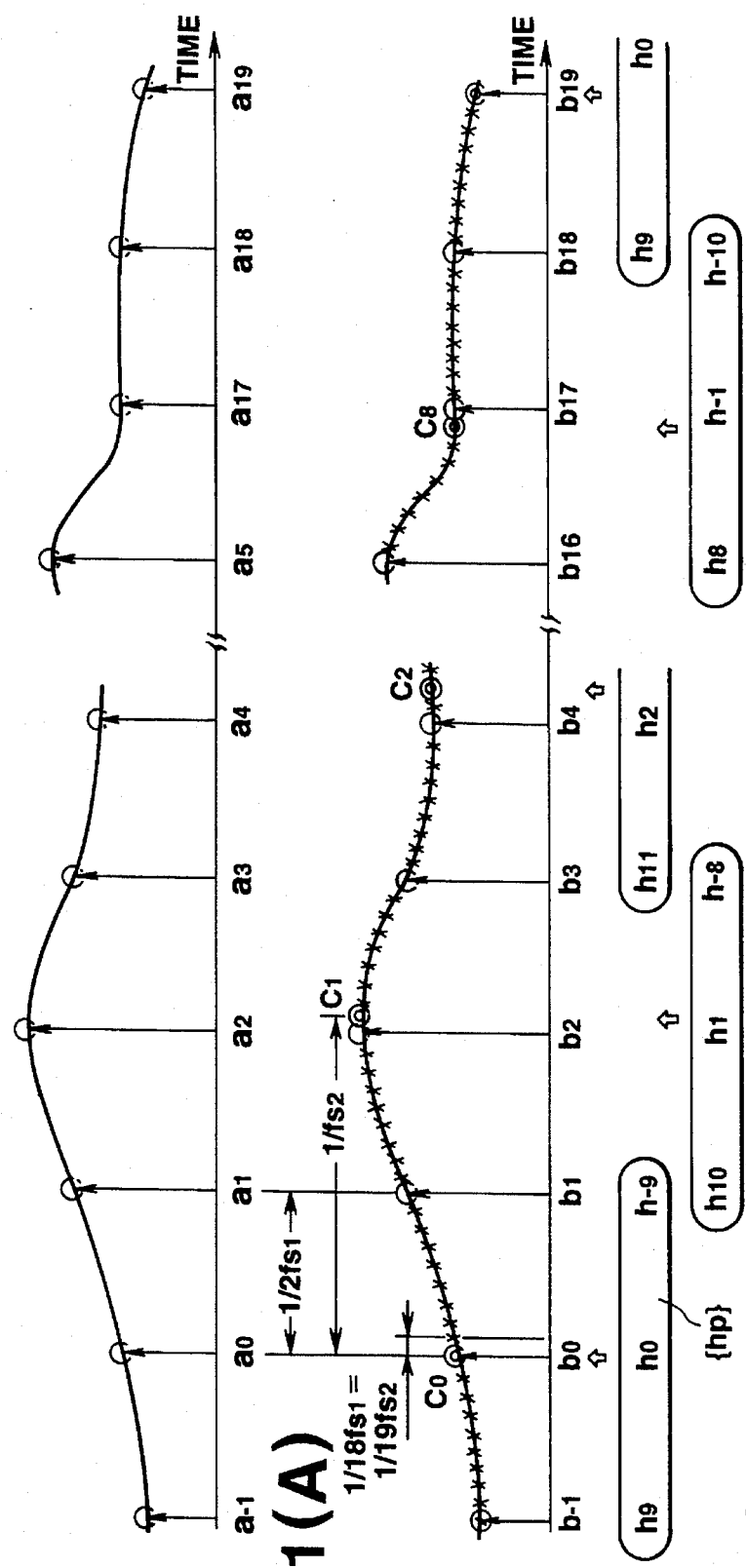

| | | | | | |
|---|---|---|---|---|---|
| FIG.13 (A) | b3 | b4 | b5 | b6 | b7 | b8 | b20 | b21 | b22 |
| FIG.13 (B) | b2 | b3 | b4 | b5 | b6 | b7 | b19 | b20 | b21 |
| FIG.13 (C) | b1 | b2 | b3 | b4 | b5 | b6 | b18 | b19 | b20 |
| FIG.13 (D) | b0 | b1 | b2 | b3 | b4 | b5 | b17 | b18 | b19 |
| FIG.13 (E) | b-1 | b0 | b1 | b2 | b3 | b4 | b16 | b17 | b18 |
| FIG.13 (F) | b-1 | b1 | b3 | b5 | b16 | b18 |
| FIG.13 (G) | b-2 | b0 | b2 | b4 | b15 | b17 |
| FIG.13 (H) | b-3 | b-1 | b1 | b3 | b14 | b16 |
| FIG.13 (I) | h-10 | h-9 | h-8 | h-7 | h-11 | h-1 |
| FIG.13 (J) | h-1 | h0 | h1 | h2 | h-2 | h8 |
| FIG.13 (K) | h8 | h9 | h10 | h11 | h7 | c8 |
| FIG.13 (L) | c-1 | c0 | c1 | c2 | c7 | c8 |
| FIG.13 (M) | c-2 | c-1 | c0 | c1 | c6 | c7 |

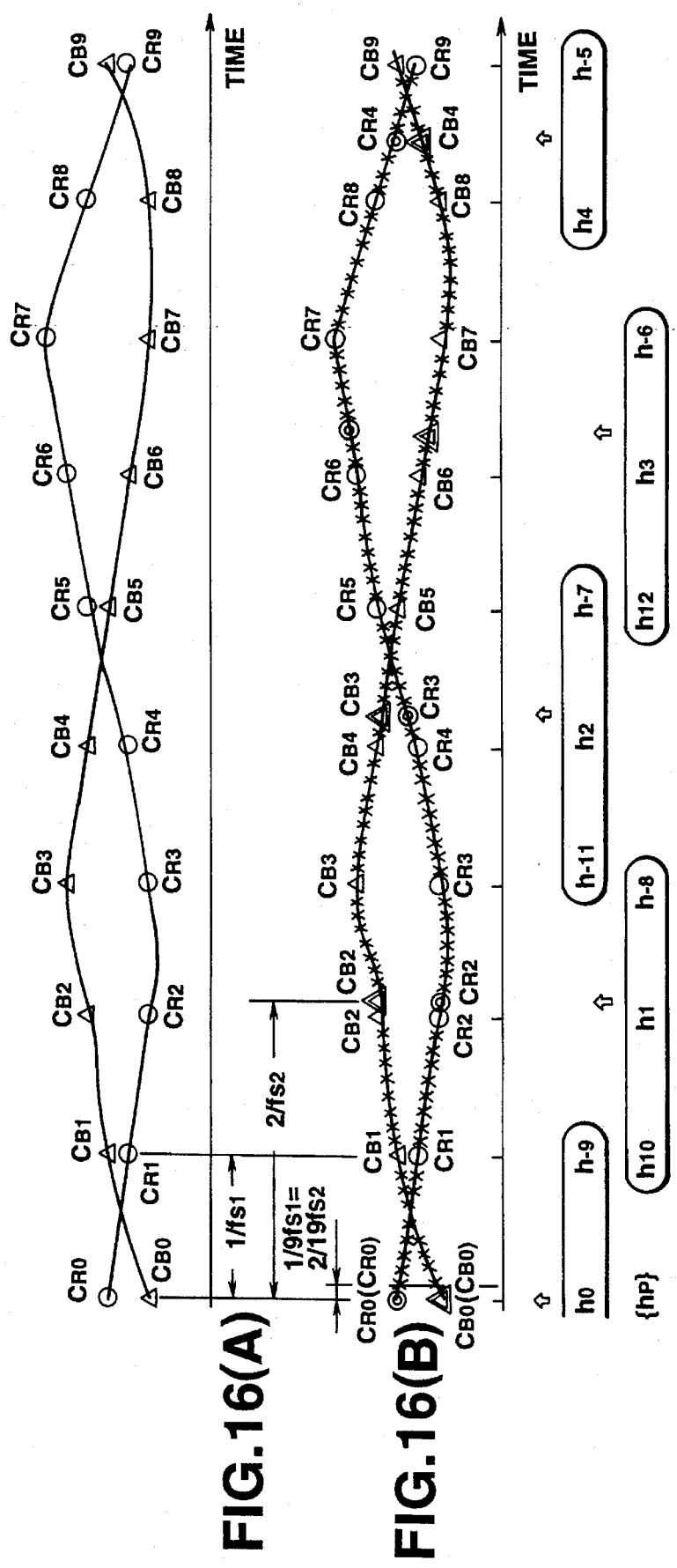

| Figure | | | | | | |
|---|---|---|---|---|---|---|
| FIG.17(A) | CR3 | CB3 | CR4 | CB4 | CR5 | CB5 | CR12 | CB12 |
| FIG.17(B) | CR2 | CB2 | CR3 | CB3 | CR4 | CB4 | CR11 | CB11 |
| FIG.17(C) | CR1 | CB1 | CR2 | CB2 | CR3 | CB3 | CR10 | CB10 |
| FIG.17(D) | CR0 | CB0 | CR1 | CB1 | CR2 | CB2 | CR9 | CB9 |
| FIG.17(E) | CR-1 | CB-1 | CR0 | CB0 | CR1 | CB1 | CR8 | CB8 |
| FIG.17(F) | CB-1 | | CR1 | CB1 | CR3 | CB7 | CR9 | |
| FIG.17(G) | CB-2 | | CR0 | CB0 | CR2 | CB6 | CR8 | |
| FIG.17(H) | CB-3 | | CR-1 | CB-1 | CR1 | CB5 | — | |
| FIG.17(I) | | h-9 | | h-8 | h-6 | h-5 | | |
| FIG.17(J) | | h0 | | h1 | h3 | h4 | | |
| FIG.17(K) | | h9 | | h10 | h12 | 0 | | |
| FIG.17(L) | | CR0 | CB0 | CR1 | CB3 | CR4 | | |
| FIG.17(M) | | CB-1 | CR0 | CB0 | CR3 | CB3 | | |

FIG.17(A)
FIG.17(B)
FIG.17(C)
FIG.17(D)
FIG.17(E)
FIG.17(F)
FIG.17(G)
FIG.17(H)
FIG.17(I)
FIG.17(J)
FIG.17(K)
FIG.17(L)
FIG.17(M)

SOLID STATE IMAGE PICK-UP APPARATUS FOR CONVERTING THE DATA CLOCK RATE OF THE GENERATED PICTURE DATA SIGNALS

This application is a continuation of application Ser. No. 08/133,296, filed Oct. 8, 1993, now abandoned.

BACKGROUND OF THE INVENTION

1. Field of the Invention

This invention relates to a sol id-state image pickup apparatus for producing digitized picture data from image pickup signals produced by a solid-state image sensor such as a CCD image sensor made up of charge-coupled devices (CCDs) and outputting the produced digitized picture data. More particularly, it relates to a solid-state image pickup apparatus having a rate converting function of converting the data clock rates of the generated picture data.

2. Description of the Prior Art

It is known in general that, in a solid-state image pickup apparatus having, as image pickup means, a solid-state image sensor having a discrete pixel structure, such as a CCD image sensor, since the solid-state image sensor itself is a sampling system, aliasing components from the spatial sampling frequency tend to be mixed into the image pickup signal from the solid-state image sensor. The conventional practice for preventing the generation of aliasing components into the baseband component of the image pickup signals is to provide a double refraction type optical low-pass filter in the image pickup optical system to suppress high-frequency components of the baseband component of the image pickup signals to satisfy the Nyquist conditions of the sampling system constituted by the solid-state image sensor.

On the other hand, with a color television camera device for imaging a color picture, a multiple CCD plate type solid-state image pickup apparatus, such as a two CCD plate type solid-state image pickup apparatus, for imaging a three-color picture by a solid-state image sensor having for imaging a green-colored picture and a solid-state image sensor having a color coding filter for red-colored and blue-colored pictures, or a three CCD plate type solid-state image pickup apparatus for imaging a three-color picture by separate solid-state image sensors, has been put to practical use.

Besides, as a technique for improving the resolution in the above-described multiple CCD plate type solid-state image pickup apparatus, there is known a spatial pixel shifting method in which the solid-state image sensors for imaging red-colored pictures and blue-colored pictures are shifted with respect to the solid-state image sensor for imaging the red-colored picture by one-half the spatial pixel sampling period. By adopting the spatial pixel shifting method, a high resolution exceeding the threshold of the number of pixels of the solid-state image sensor may be realized with the multiple CCD plate type solid-state image pickup apparatus with an analog output.

On the other hand, a D-1 standard or a D-2 standard is prescribed as the standard for an industrial digital VTR employed in e.g. a telecasting station. Thus a digital interface for a digital video related equipment conforming to these standards has become necessary to provide for a color television apparatus.

It is noted that with the D-1 standard for 4:2:2 digital component video signals, the sampling frequency is set to 13.5 MHz, corresponding to 858 times the horizontal frequency $f_{H(NTSC)}$ for the NTSC system and to 864 times the horizontal frequency $f_{H(PAL)}$ for the PAL system, and is adapted for being locked at a frequency equal to an integer number times the horizontal frequency for either systems. On the other hand, with the D-2 standard for the digital composite video signals, the sampling frequency is set to four times the subcarrier frequency to minimize beat interference between the subcarrier and sampling clocks, with the sampling frequency $f_{S(NTSC)}$ for the NTSC system and the sampling frequency for the PAL system $f_{S(PAL)}$ being 14.3 MHz and 17.734 MHz, respectively.

Meanwhile, if it is desired to implement a solid-state image pickup apparatus capable of directly outputting digital picture signals conforming to the above-mentioned D-1 and D-2 standards, such digital picture signals being high in resolution and picture quality and containing only little aliasing distortion components, it is necessary that the sampling rate (number of pixels) of the solid-state image sensor employed in the image pickup unit be set so as to be higher than the sampling rate for the D-1 or D-2 standard, in consideration that the optical low-pass filter as a prefilter for the solid-state image sensor is optically not unobjectionable, that is that only smooth roll-off characteristics may be obtained with the optical low-pass filter such that high modulation transfer function (MTF) characteristics may be obtained only at the costs of increase in the aliasing distortion components.

Besides, if account is taken of the fact that correction of pixel-based defects in the image pickup signals by the solid-state image sensor is performed by a digital technique, and the beat interference has to be prevented from occurring, it is desirable that the sampling rate of the solid-state image sensor be coincident with that of the analog-to-digital converting unit adapted for digitizing the image pickup signals supplied by the solid-state image sensor.

The CCD image sensor now in widespread use is driven at the clock rate of 14.3 MHz=$f_{SC(NTSC)}$. With a digital camera having its image pickup unit constituted by such CCD image sensor, image pickup signals outputted from the solid-state image sensor are digitized at the above-mentioned clock rate of 14.3 MHz=$f_{SC(NTSC)}$ by way of performing a digital signal processing operation.

However, the clock rate in the D-1 standard, which is the standard for the above-mentioned 4:2:2 digital component video signals, cannot be matched to the clock rate for the above-mentioned digital camera having its image pickup unit constituted by such CCD image sensor, with the luminance signal Y and the color difference signals $C_R/C_B$ for the D-1 standard being 13.5 MHz and 6.75 MHz, respectively. If a CCD image sensor having the readout rate of 13.5 MHz is to be fabricated newly for meeting the D-1 standard, there is raised a problem in connection with costs and limitation in general adaptability.

On the other hand, with the multiple CCD plate type solid-state image pickup apparatus, constructed in accordance with the spatial pixel shifting method, the analog output cannot be improved in resolution unless a signal processing system operated at a clock rate of $2f_{s1}$, which is double the clock rate $f_{s1}$ of the CCD image sensor, is employed. Although it may be contemplated to process signals at $f_{s1}$ and $2f_{s1}$ and to turn the signals into analog signals at $f_{s1}$ and $2f_{s1}$, with the analog signals being then passed through an analog filter so as to be digitized again at the clock rate prescribed by the D-1 standard. However, in such case, beat interference is produced between the 14.3

MHz system and the 13.5 MHz system to incur deterioration picture quality.

OBJECTS OF THE INVENTION

In view of the above-depicted status of the art, it is an object of the present invention to provide a solid-state image pickup apparatus wherein digital picture signals with the clock rate of the D-1 standard or other clock rates may be obtained using a standard CCD image sensor.

It is another object of the present invention to provide a solid-slate image pickup apparatus wherein high picture quality digital picture signals free of beat interference may be produced with the aid of a signal processing system operated at the same clock rate as the clock rate for the CCD image sensor.

It is a further object of the present invention to provide a solid-state image pickup apparatus wherein the digital picture signal with a high modulation transfer function (MTF) may be obtained with the use of the spatial pixel shifting method.

It is yet another object of the present invention to provide a solid-state image pickup apparatus which is simplified in construction by simplifying the construction of digital processing means performing a rate converting operation.

SUMMARY OF THE INVENTION

In view of the above objects, the present invention provides a solid-state image pickup apparatus comprising at least one solid-state image sensor driven at a rate $f_{s1}$, an analog-to-digital converting unit for digitizing picture signals outputted from the solid-state image sensor at the rate $f_{s1}$ of a predetermined phase, a first digital processing unit for generating at least a digital luminance signal Y and two digital color difference signals $C_R$ and $C_B$ from the picture data digitized by the analog to digital converting unit, and a second digital processing unit for converting the input data rate signals Y, $C_R$ and $C_B$ related to the above rate $f_{s1}$ generated by the first digital processing unit into signals Y, $C_R$ and $C_B$ having the output data rate related to the above rate $f_{s1}$. The second digital processing unit comprises a half band filter having a passband of $f_{s2}/2$, $f_{s2}/4$, $f_{s2}/4$ for performing bandwidth limitation on the input data rate signals Y, $C_R$ and $C_B$ generated by the first digital processing unit, at the output data rates of $2f_{s1}$, $f_{s1}$, $f_{s1}$, and a rate converting filter for performing rate conversion of from $2f_{s1}$ to $f_{s2}$, from $f_{s1}$ to $f_{s2}/2$ or $f_{s2}/4$, from $f_{s1}$ to $f_{s2}/2$ or $f_{s2}/4$, for outputting the low order linear phase finite impulse response sufficient to suppress high-order sideband components in the vicinity of $n\times 2f_{s1}$, $n\times f_{s1}$, $n\times f_{s1}$, n being a positive integer, in a form that can be down-sampled at $f_{s2}$, $f_{s2}/2$ or $f_{s2}/4$, $f_{s2}/2$ or $f_{s2}/4$, with the half band filter having characteristics of compensating bandpass roll-off characteristics of the rate converting filter.

With the solid-state image pickup apparatus according to the present invention, the rate converting filter has at least one zero point at $n\times 2f_{s1}$, $n\times f_{s1}$, $n\times f_{s1}$ and each two zero points in the vicinity thereof.

With the solid-state image pickup apparatus according to the present invention, the rate converting filter is constituted by a plurality of multipliers.

With the solid-state image pickup apparatus according to the present invention, the half band filter comprises a product of partial filters each constituted by integer coefficients.

The present invention also provides a solid-state image pickup apparatus comprising a plurality of solid-state image sensors arranged in a color-separating system in accordance with the spatial pixel shifting method so as to be driven at a predetermined rate of $f_{s1}$, analog-to-digital converting means coupled to the image sensors for digitizing the image signals at a rate of $f_{s1}$, first digital processing means supplied with the image signals digitized by the analog-to-digital converting means for providing at least a digital luminance signal Y ($2f_{s1}$) having a rate equal to $2f_{s1}$ and two digital color difference signals $C_R$ ($f_{s1}$) and $C_B$ ($f_{s1}$) each having a rate equal to $f_{s1}$, second digital processing means coupled to the first digital processing means for converting the data rate of the input data rate signals Y ($2f_{s1}$), $C_R$ ($f_{s1}$), $C_B$ ($f_{s1}$) from m to n, m and n being natural numbers, for providing a digital luminance signal Y($f_{s2}$) having a rate equal to $f_{s2}=2f_{s1}\cdot n/m$ and two color difference signals $C_R$ ($f_{s2}$) and $C_B$ ($f_{s2}$) having a rate substantially equal to $f_{s2}/2$.

The second digital processing unit in the solid-state image pickup apparatus according to the present invention comprises a half band filter having a passband of $f_{s2}$, $f_{s2}/2$ and $f_{s2}/2$ for the input data rate signals Y ($2f_{s1}$), $C_R$ ($f_{s1}$) and $C_B$ ($f_{s1}$), respectively, generated by the first digital processing unit at output data rates of $2f_{s1}$, $f_{s1}$ and $f_{s1}$, respectively, and a rate converting filter for performing suppression of high-order side-band components in the vicinity of $n\times 2f_{s1}$, $n\times f_{s1}$ and $n\times f_{s1}$, respectively, on signals Y ($2f_{s1}$), $C_R$ ($f_{s1}$) and $C_B$ ($f_{s1}$) supplied via the half band filter in the down-sampled form of $f_{s2}$, $f_{s2}/2$ and $f_{s2}/2$, respectively, n being a natural number.

The solid-state image pickup device digitizes image pickup (picture) signals outputted from at least a solid-state image sensor driven at a rate $f_{s1}$, at a rate $f_{s1}$ with a predetermined phase by a predetermined analog-to-digital converting unit to form digital image pickup data, generates a digital luminance signal Y and two digital chrominance signals $C_R$, $C_B$ from the digital image pickup data by a first digital processing unit operated at a clock rate related to the rate $f_{s1}$, and converts the signals Y, $C_R$ and $C_B$ having an input data rate related to the $f_{s1}$ rate into signals Y, $C_R$ and $C_B$ having an output data rate related to the $f_{s2}$ rate by a second digital processing unit. The second digital processing unit performs bandwidth limitation on the input data rate signals Y, $C_R$ and $C_B$, generated by the first signal processor, at output data rates of $2f_{s1}$, $f_{s1}$ and $f_{s1}$, by a half band filter having a passband of $f_{s2}/2$, $f_{s2}/4$ and $f_{s2}/4$, respectively, and performs rate conversion of from $2f_{s1}$ to $f_{s2}$, from $f_{s1}$ to $f_{s2}/2$ or $f_{s2}/4$, from $f_{s1}$ to $f_{s2}/2$ or $f_{s2}/4$, for outputting the low order linear phase finite impulse response sufficient to suppress high-order sideband components in the vicinity of $n\times 2f_{s1}$, $n\times f_{s1}$, $n\times f_{s1}$, n being a positive integer, in a form that can be down-sampled at $f_{s2}$, $f_{s2}/2$ or $f_{s2}/4$, $f_{s2}/2$ or $f_{s2}/4$, respectively. Besides, the bandpass roll-off characteristics of the rate converting filter may be compensated by the characteristics of the half band filter.

With the solid-state image pickup apparatus according to the present invention, the signal limited in bandwidth by the half band filter is rate-converted by a rate converting filter having an integer coefficient impulse response having at least one zero point at $n\times 2f_{s1}$, $n\times f_{s1}$ and $n\times f_{s1}$ and each two zero points in the vicinity thereof.

With the solid-state image pickup apparatus according to the present invention, the signals limited in bandwidth by the half band filter are rate-converted by a rate converting filter.

With the solid-state image pickup apparatus according to the present invention, the input data rate signals Y, $C_R$ and $C_B$ generated by the first digital processing unit, are limited in bandwidth by a half band filter comprising a product of partial filters each constituted by integer coefficients.

Besides, with the solid-state image pickup apparatus according to the present invention, output image pickup signals of plural solid-state image sensors arranged in the color-separation optical system in accordance with the spatial pixel shifting method so as to be driven at the rate $f_{s1}$ are digitized by the analog-to-digital converting unit at the rate $f_{s1}$ having a predetermined phase, at least a $2f_{s1}$ rate digital luminance signals Y ($2f_{s1}$) and two $f_{s1}$ rate digital color difference signals $C_R$ ($f_{s1}$) and $C_B$ ($f_{s1}$) are generated by the first digital processing unit from the digitized image pickup data and rate-converted by the second digital processing unit from m to n, m and n being positive integers, for generating digital luminance signals Y ($f_{s2}$) having the rate of $f_{s2}= f_{s1} \cdot n/m$ and digital color difference signals $C_R$ ($f_{s2}$) and $C_B$ ($f_{s2}$) $C_B$ having substantially the data rate of $f_{s2}/2$.

On the other hand, with the solid-state image pickup apparatus according to the present invention, the second digital processing unit performs bandwidth limitation on the input rate signals Y ($2f_{s1}$), $C_R$ ($f_{s1}$) and $C_B$ ($f_{s1}$) generated by the first digital processing unit at the output rates of $2f_{s1}$, $f_{s1}$ and $f_{s1}$, by a half band filter having a passband of $f_{s2}/2$, $f_{s2}/4$ and $f_{s2}/4$, respectively, and generates digital color difference signals $C_R$ ($f_{s2}$), $C_B$ ($f_{s2}$) $C_B$ having substantially the rate of $f_{s2}/2$.

BRIEF DESCRTPTTON OF THE DRAWINGS

FIG. 10a–i is a spectral diagram for illustrating the operation of the rate converting circuit for luminance signals.

FIG. 11a–b is a timing chart for illustrating the operation of the rate converting circuit for luminance signals.

Figure 12:
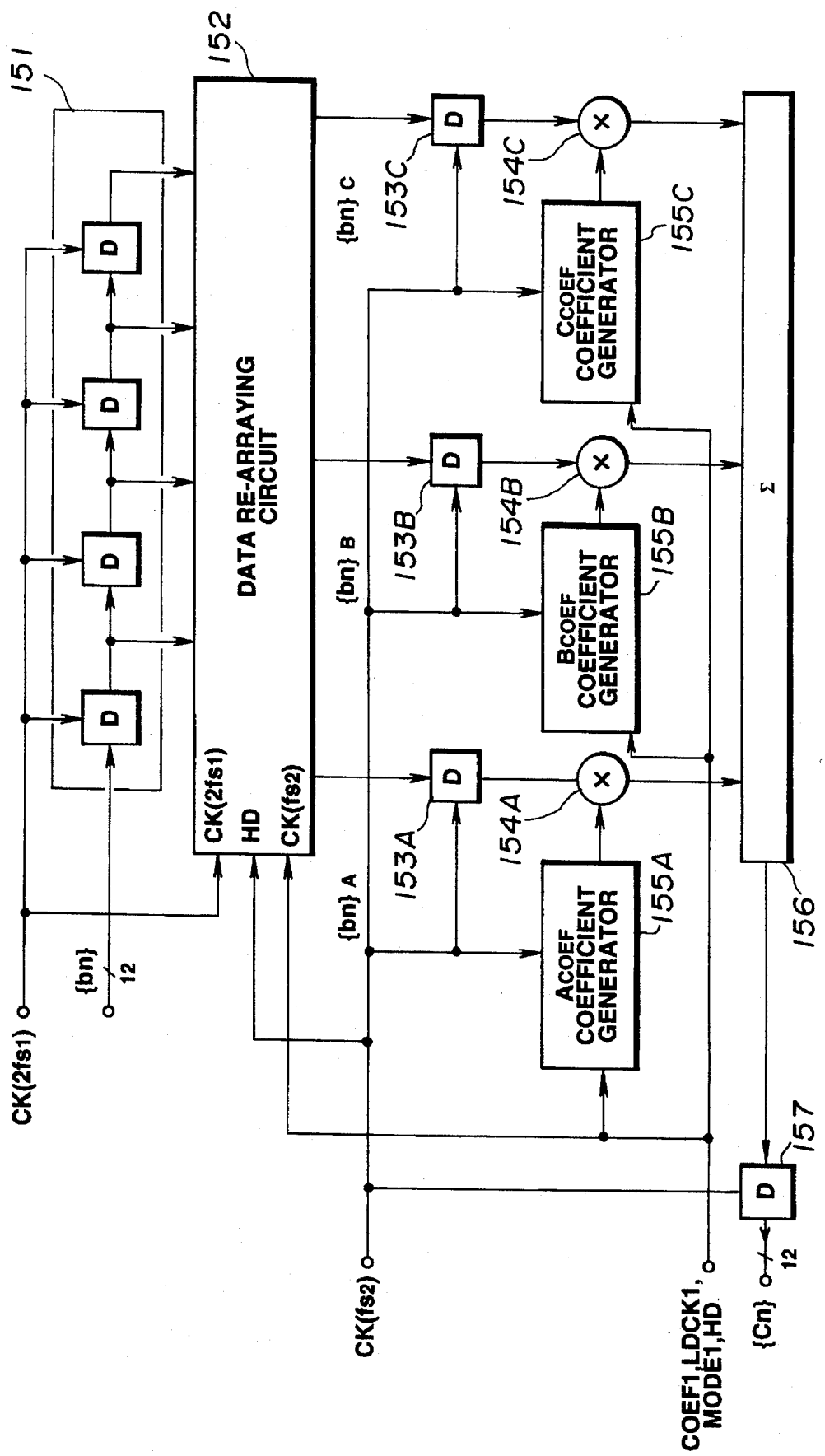

FIG. 12 is a block circuit diagram for illustrating an illustrative construction of a rate converting filter in the rate converting circuit for luminance signals.

FIG. 13a–m is a timing chart for illustrating the operation of the rate converting filter for luminance signals.

Figure 14:
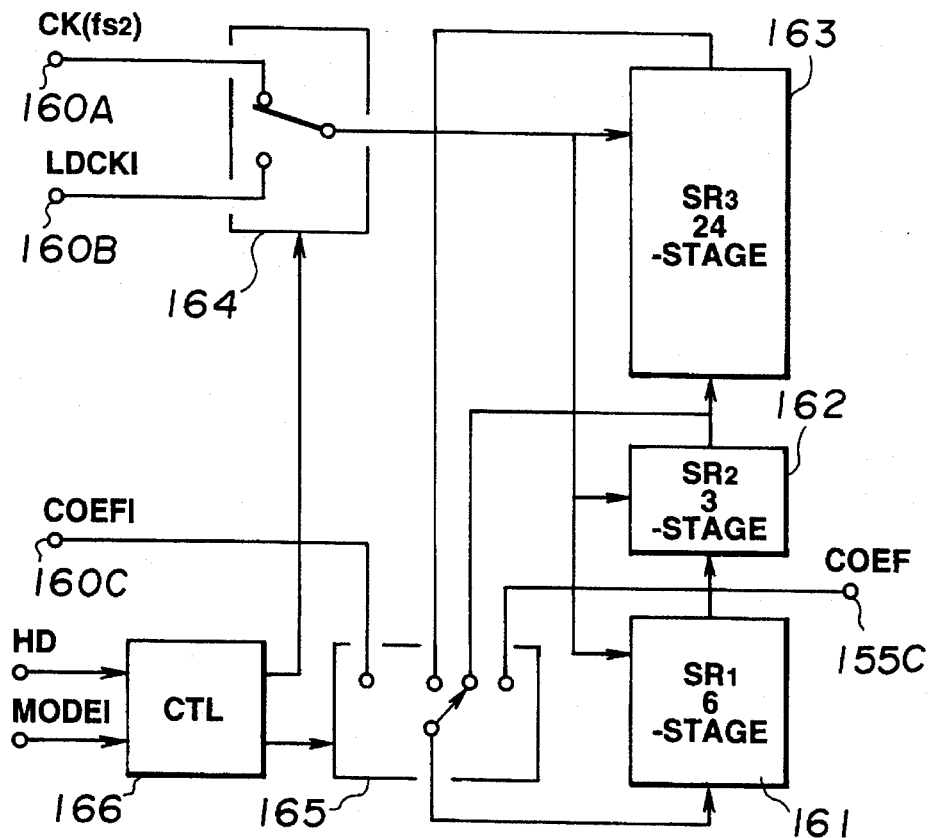

FIG. 14 is a block circuit diagram for illustrating an illustrative construction of a coefficient generator in the rate conversion filter for luminance signals.

Figure 15:
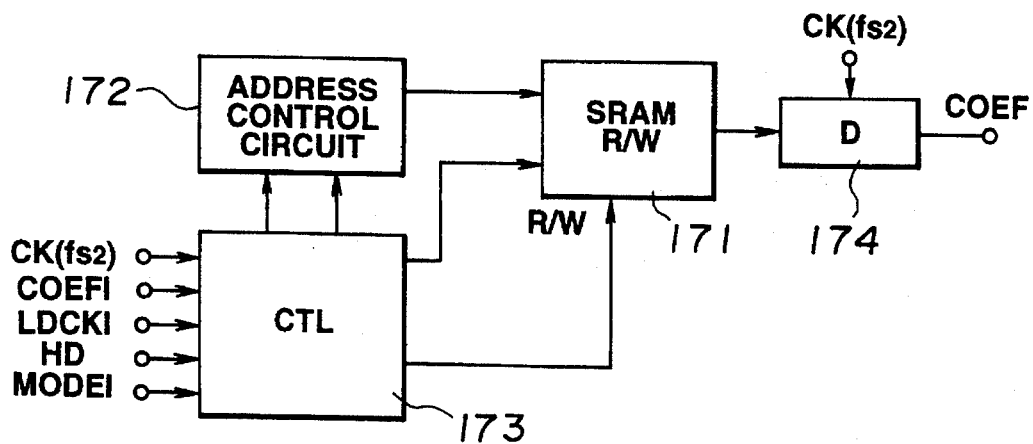

FIG. 15 is a block circuit diagram for illustrating another illustrative construction of a coefficient generator in the rate conversion filter for luminance signals.

FIG. 16a–b is a timing chart for illustrating the operation of the rate converting circuit for color difference signals.

FIG. 17a–m is a timing chart for illustrating the operation of the rate converting filter for color difference signals.

Figure 18:
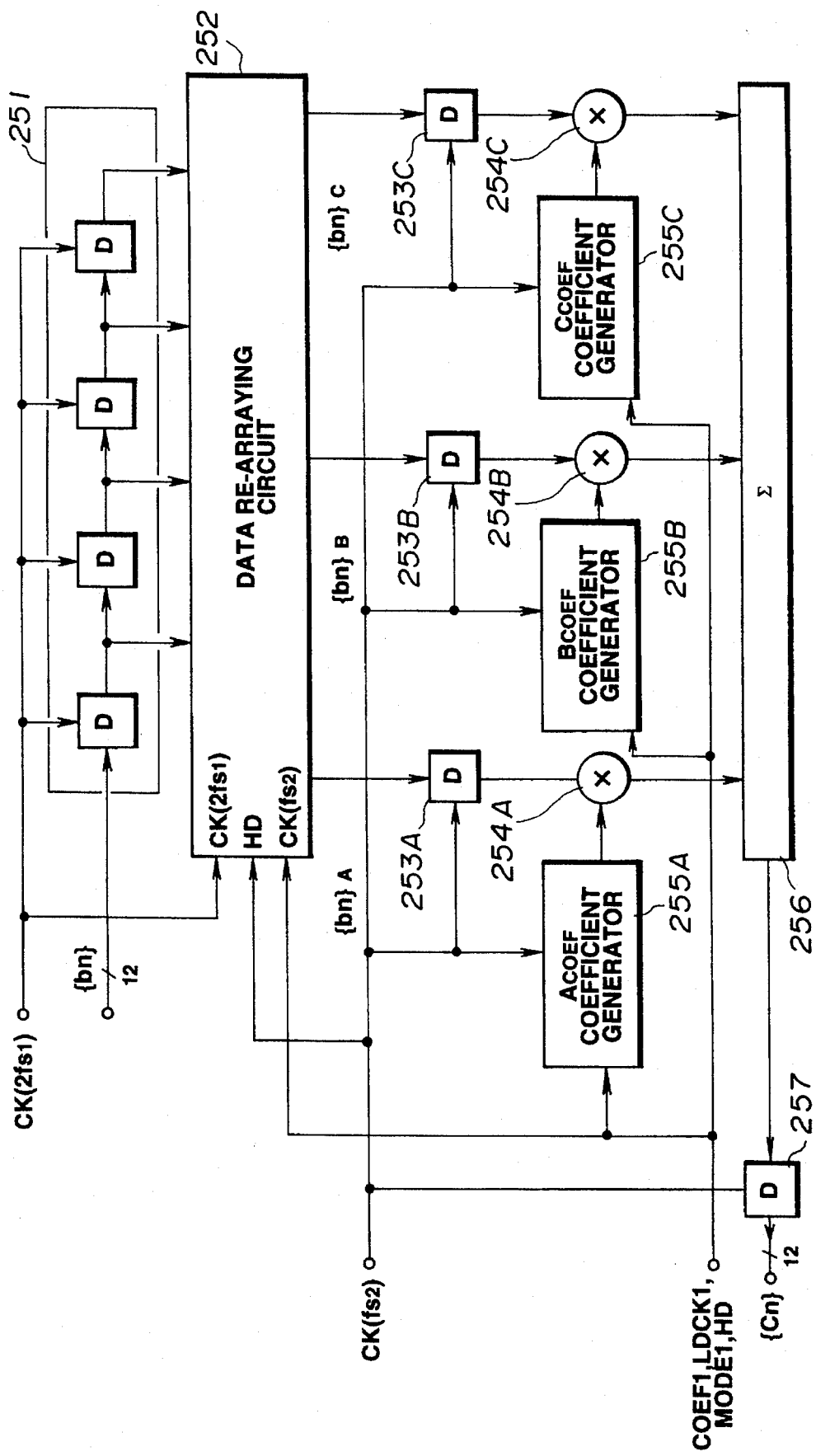

FIG. 18 is a block circuit diagram for illustrating an illustrative construction of the rate converting filter in the rate converting circuit for color difference signals.

Figure 19:
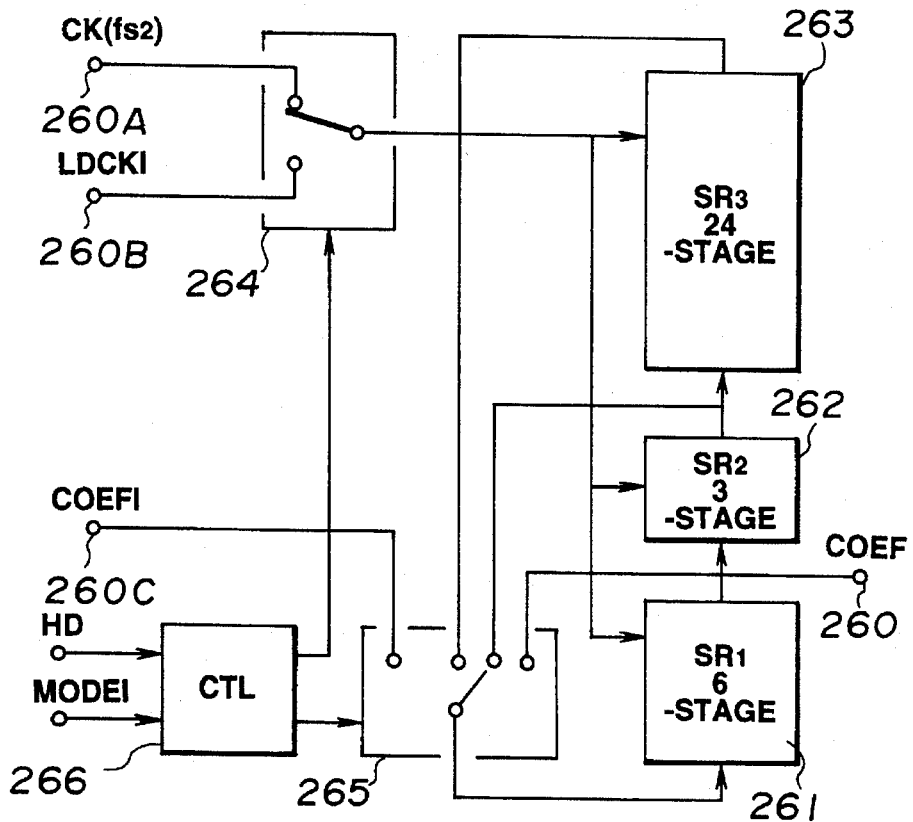

FIG. 19 is a block circuit diagram for illustrating ,an illustrative construction of a coefficient generator in the rate conversion filter for color difference signals.

Figure 20:
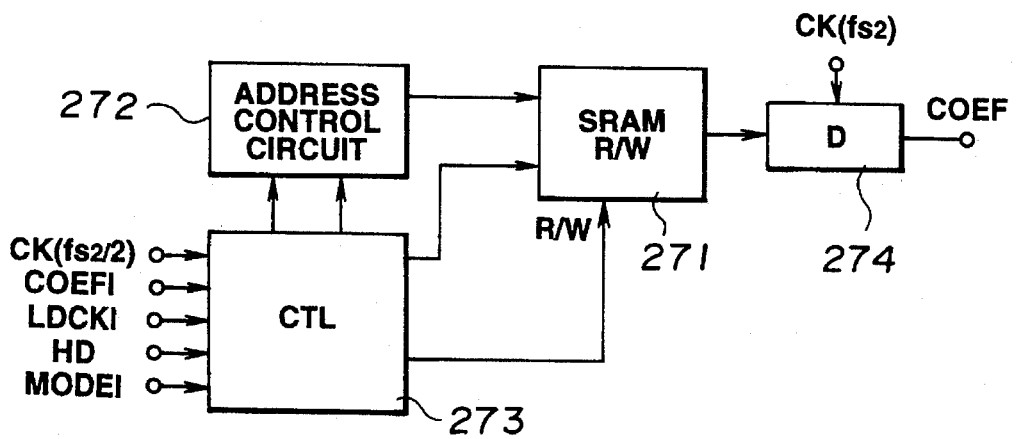

FIG. 20 is a block circuit diagram for illustrating another illustrative construction of a coefficient generator in the rate conversion filter for color difference signals.

Figure 21:
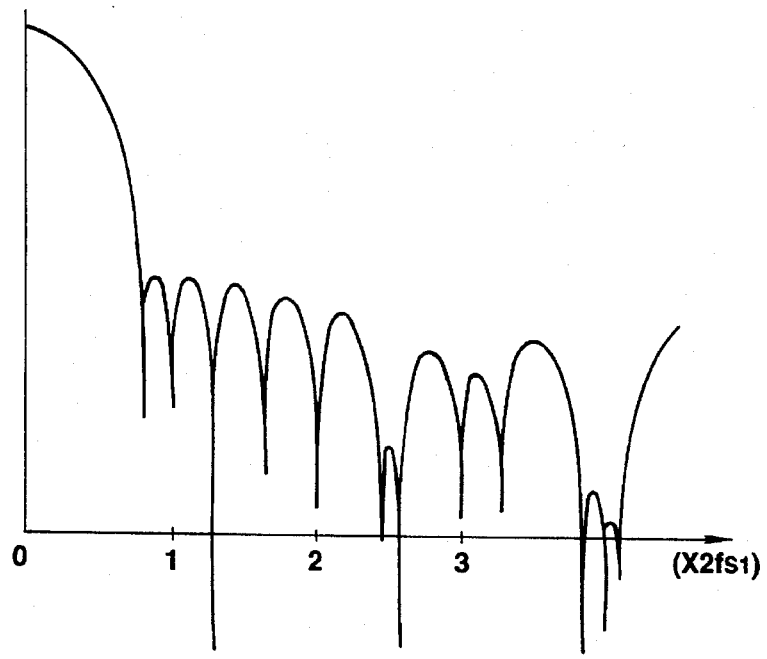

FIG. 21 is a graph showing a concrete example of the characteristics of the rate converting filter for luminance signals.

Figure 22:
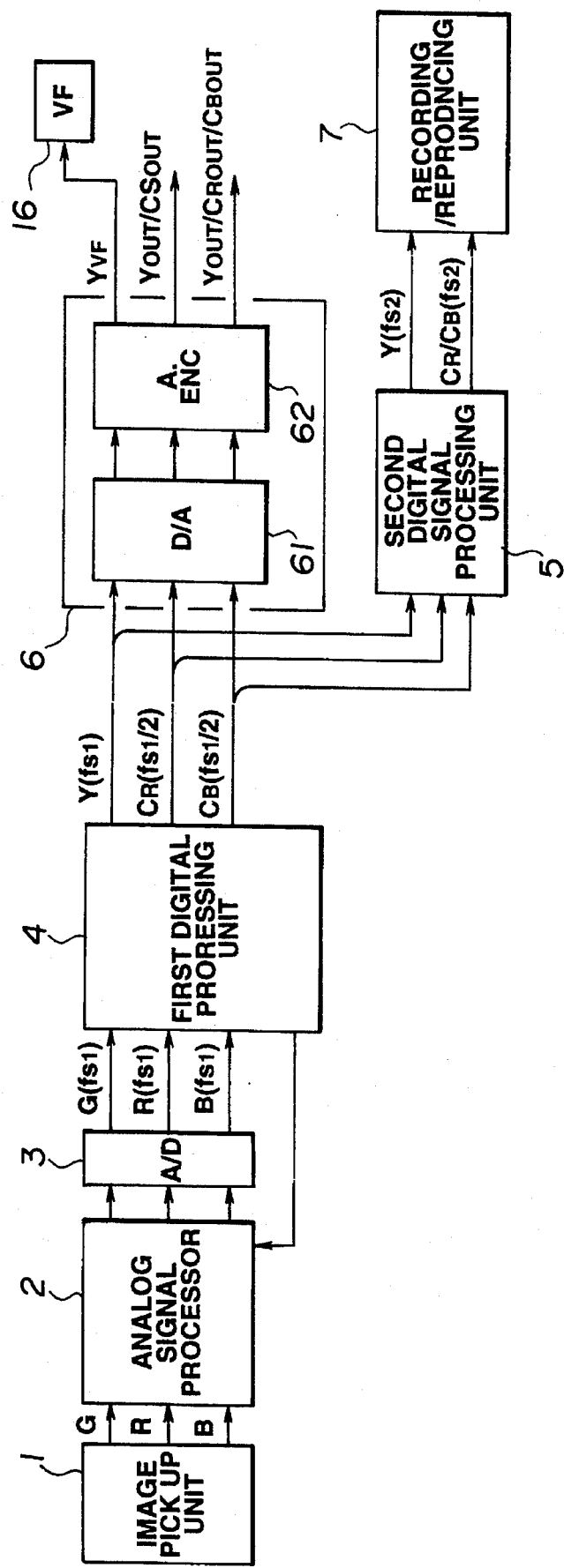

FIG. 22 is a block diagram showing the operating state of essential parts for the recording mode of the digital cam corder.

Figure 23:
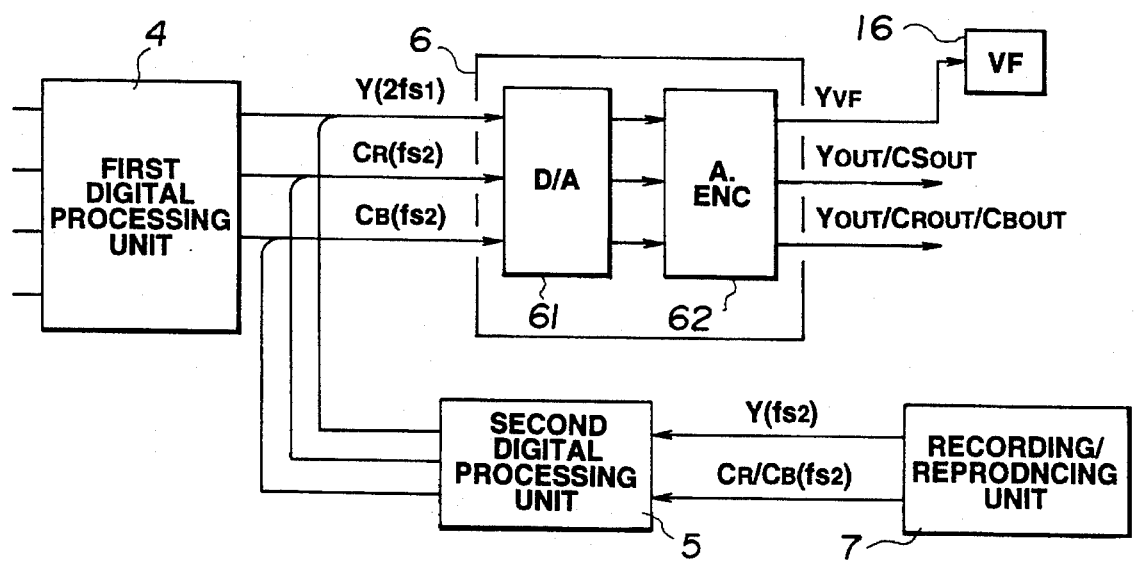

FIG. 23 is a block circuit diagram showing the operating state of essential parts for the playback mode of the digital cam corder.

DETAILED DESCRIPTION OF THE PREFERRED EMBODIMENTS

Referring to the drawings, certain preferred embodiments of the present invention will be explained in detail.

Figure 1:
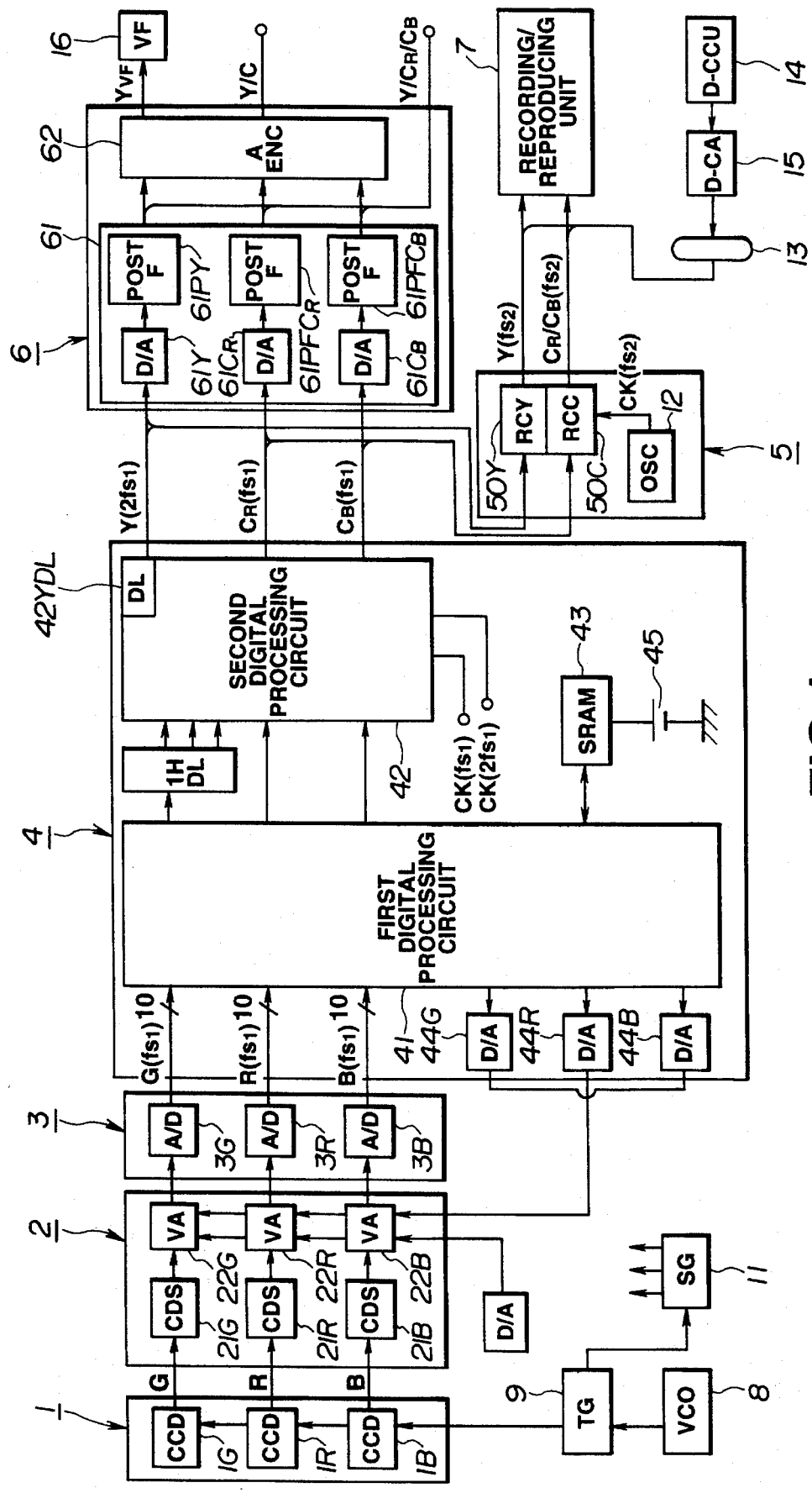
FIG. 1 is a block diagram showing an arrangement of a digital cam corder embodying the present invention.

The solid state image pickup apparatus is arranged as shown for example in FIG. 1.

The solid-state imaging device according to the fi rat embodiment shown in FIG. 1 is a digital cam corder in which imaging signals produced by an image pickup unit 1 are digitized so as to be recorded as picture data conforming to the D1 standard. The solid-state image pickup apparatus includes an analog-to-digital converting unit 3 to which three-color image pickup signals R, G and B produced by the image pick-up unit 1 are supplied via an analog signal processing unit 2, a first digital processing unit 4 to which the color image pick-up data digitized by the A/D converting unit 3 are supplied, a second digital processing unit 5 to which a digital luminance signal Y and two digital color difference signals $C_R$, $C_B$ generated by the first digital processing unit 4 are supplied, and a signal processing unit for an analog output 6. A recording/reproducing unit 7 for recording and reproducing picture data conforming to the D1 standard is connected to the second digital processing unit 5.

The color image pickup unit 1 is made up of three CCD plate type CCD image sensors 1R, 1G and 1B for separating an image pickup light incident thereto from an image pickup lens, not shown, via an optical low-pass filter into three color light components by a color-separating prism, not shown, for forming a three-color picture of an object image.

In the present embodiment, the three CCD image sensors 1R, 1G and 1B are arrayed in accordance with a spatial pixel shifting method in which the red-color image pickup CCD image sensor 1R and the blue-color image pickup CCD image sensor 1B are arrayed with a spatial shift of one-half the spatial sampling period $\tau_s$ with respect to the green-color image pickup CCD image sensor 1G.

Meanwhile, the present invention may be applied not only to the three CCD plate type solid-state image pickup apparatus constructed in accordance with the spatial pixel shifting method of the present embodiment, but may also be applied to a single CCD or double CCD plate type solid-state image pickup apparatus or to a three CCD plate type solid-state image pickup apparatus not constructed in accordance with the spatial pixel shifting method.

Each of the three CCD image sensors 1R, 1G and 1B is driven at an $f_{s1}$ rate by a driving clock CK($f_{s1}$) generated by a timing generator (TG) 9 on the basis of a $2f_{s1}$ rate clock supplied from a voltage controlled oscillator (VCO) 8.

The number of pixels of each of the three CCD image sensors 1R, 1G and 1B is selected so that the image pickup charges are read out at a rate of $f_{s1}$=910 $f_H$ for EIA and at a rate of $f_{s1}$= 912 $f_H$ for CCIR. The oscillation frequency of VCO 8 is set to $2f_{s1}$, while the timing generator 9 is adapted for driving the three CCD image sensors 1R, 1G and 1B by the $f_{s1}$ rate driving clocks CK ($f_{s1}$) obtained by halving the frequency of the clock CK ($2f_{s1}$).

The respective color image pickup signals R($f_{s1}$), G($f_{s1}$) and B($f_{s1}$), read out at the $f_{s1}$ rate from the CCD image sensors 1R, 1G and 1B, respectively, are supplied to the analog signal processing unit 2.

The analog signal processing unit 2 is made up of a correlated double sampling processing circuits (CDS processing circuits) 21R, 21G and 21B, and level controlling circuits 22R, 22G and 22B. The CDS processing circuits 21R, 21G and 21B perform correlated double sampling on the color image pickup signals R, G and B, read out from the CCD image sensors 1R, 1G and 1B at the $f_{s1}$ rate, respectively. Besides, the level controlling circuits 22R, 22G and 22B perform level control, such as white balance or black balance control, on %he color image pickup signals R, G and B, respectively.

The A/D converter 3, supplied via the analog signal processor 2 with the respective color pickup signals R($f_{s1}$), G($f_{s1}$) and B($f_{s1}$), produced by the image-pickup unit 1, is made up of three A/D converters 3R, 3G and 3B, each having a word length of 10 bits. These A/D converters 3R, 3G and 3B are supplied from the timing generator 9 with the driving clocks Ck ($f_{s1}$) having a predetermined phase and a rate $f_{s1}$ equal to the sampling rate of each of the respective color image pickup signals R($f_{s1}$), G($f_{s1}$) and B($f_{s1}$). The A/D converters 3R, 3G and 3B of the A/D converting unit 3 digitize the respective color signals R($f_{s1}$), G($f_{s1}$) and B($f_{s1}$) at the rate equal to $f_{s1}$ by the above-mentioned driving clocks CK($f_{s1}$), for forming respective digital color signals R($f_{s1}$), G($f_{s1}$) and B($f_{s1}$), having the same signal spectrum as the spectrum of each of the respective color signals R($f_{s1}$), G($f_{s1}$) and B($f_{s1}$), respectively.

Meanwhile, the A/D converters 3R, 3G and 3B may also be designed to have a word length on the order of 12 to 14 bits.

The respective color signals R($f_{s1}$), G($f_{s1}$) and B($f_{s1}$), with the rate equal to $f_{s1}$, digitized by the A/D converting unit 3, are supplied to the first digital processing unit 4.

The first digital processing unit 4 is made up of a first digital processing circuit 41 and a second digital processing circuit 42.

The first digital processing circuit 41 is activated at the rate equal to $f_{s1}$ by the driving clocks CK ($f_{s1}$) supplied from the timing generator 9 for detecting a variety of correcting signal levels of the respective digital color signals R($f_{s1}$), G($f_{s1}$) and B($f_{s1}$) supplied from the A/D converting unit 3 for storing e.g. white balance controlling data, black balance controlling data, black shading correction data, white shading correction data or defect correction data in a memory 43, converting the respective color signals into analog signals by D/A converters 44R, 44G and 44B, and feeding back the analog color signals to the level controlling circuits 22R, 22G and 22B of the analog signal processing unit 2, respectively, for performing white/black balance control, shading correction or defect correction.

Meanwhile, the memory 43 is an SRAM connected to a battery 45 as a backup power source.

Thus, in the present embodiment, the respective color pickup signals R($f_{s1}$), G($f_{s1}$) and B($f_{s1}$), read out at the rate equal to $f_{s1}$ from the respective CCD image sensors 1R, 1G and 1B, are digitized by the A/D converting unit 3 for producing the respective color image pickup signals R($f_{s1}$), G($f_{s1}$) and B($f_{s1}$), respectively, so that the first digital processing circuit 41 may be activated at the rate equal to $f_{s1}$ for performing pixel-based picture processing, such as shading correction or defect correction.

On the other hand, the second digital processing circuit 42 performs picture enhancement, pedestal addition, non-linear processing, such as gamma or knee processing or linear matrix processing, on the respective color image pickup signals R, G and B, processed with the pixel-based processing by the first digital processing circuit 41. Besides, the second digital processing circuit 42 generates, by the matrix processing, a digital luminance signal Y ($2f_{s1}$) and two digital color difference signals $C_R$ ($f_{s1}$) and $C_B$ ($f_{s1}$) from the respective color image pickup signals R($f_{s1}$), G($f_{s1}$) and B($f_{s1}$).

It is noted that the second digital processing circuit 42, supplied with the clocks CK ($2f_{s1}$), having the rate equal to $2f_{s1}$, from the VCO 8, and with the driving clocks CK ($f_{s1}$), having the rate equal to $f_{s1}$, from the timing generator 9, is activated with these clocks CK ($2f_{s1}$) and CK ($f_{s1}$) as master clocks for performing well-known high resolution processing corresponding to the spatial pixel shifting method in the image pickup unit 1 for generating the digital luminance signal Y ($2f_{s1}$) having the rate equal to $2f_{s1}$ and the two digital color difference signals $C_R$ ($f_{s1}$) and $C_B$ ($f_{s1}$) each having the rate equal to $f_{s1}$.

Meanwhile, the master clocks CK ($2f_{s1}$) and CK ($f_{s1}$) are also supplied to a synchronizing signal generator (SG) 11 for generating various synchronizing signals, such as horizontal synchronizing signals HD or vertical synchronizing signals VD.

On the other hand, the second digital processing unit 5 performs bidirectional rate conversion between signals having the data rate related to the rate $f_{s1}$ and signals having the data rate related to the rate $f_{s2}$. For the recording mode, the second digital processing unit 5 converts the signals Y ($2f_{s1}$), $C_R$ ($f_{s1}$) and $C_B$ ($f_{s1}$), related to the rate $f_{s1}$, generated by the first digital processing unit 4, into signals Y ($f_{s2}$), $C_R$ ($f_{s2}/2$) and $C_B$ ($f_{s2}/2$), related to the rate $f_{s2}$, for supplying the converted data to the recording/reproducing unit 7. For the playback mode, the second digital processing unit 5 converts the signals Y ($f_{s2}$), $C_R$ ($f_{s2}/2$) and $C_B$ ($f_{s2}/2$), related to the rate $f_{s2}$, into signals Y ($2f_{s1}$), $C_R$ ($f_{s1}$) and $C_B$ ($f_{s1}$), related to the rate $f_{s1}$, for supplying the converted data to the signal processing unit for analog output 6.

The second digital processing unit 5 is made up of a rate converting circuit 50Y for the luminance signal and a rate converting circuit 50C for the color difference signals.

A digital interface 13 for external equipment is provided between the second digital processing unit 5 and the recording/reproducing unit 7. For an external input mode, the second digital processing unit 5 converts digital return signals Y ($f_{s2}$), $C_R$ ($f_{s2}/2$) and $C_B$ ($f_{s2}/2$), related to the rate $f_{s2}$, entered from a digital camera control unit (D-CCU) 14 via a camera adapter D-CA 15, into signals Y ($2f_{s1}$), $C_R$ ($f_{s1}$) and $C_B$ ($f_{s1}$), having the rate $f_{s1}$, for supplying the converted signals to the signal processing unit for analog output 6.

In the present embodiment, the signal processing unit for analog output 6 plays the role of an analog interface for the signals Y ($2f_{s1}$), $C_R$ ($f_{s1}$) and $C_B$ ($f_{s1}$), related to the rate $f_{s1}$, generated by the first digital processing unit 4 or the second digital processing unit 5, and is made up of a digital/analog (D/A) converting unit 61 and an analog encoder 62.

The D/A converting unit 61 is made up of three D/A converters 61Y, 61$C_R$ and 61$C_B$ and three post-filters 61PFY, 61PFC$_R$ and 61PFC$_B$.

In the D/A converting unit 61, the digital luminance signal Y ($2f_{s1}$), having the data rate equal to $2f_{s1}$, is converted into an analog signal, which is then freed of a sampling carrier component by the post-filter 61Y playing the role of a Nyquist filter, before being supplied to the analog encoder 62. On the other hand, the two digital color difference signals $C_R$ ($f_{s1}$) and $C_B$ ($f_{s1}$), having the rate equal to $f_{s1}$, are converted by the D/A converters 61$C_R$ and 61$C_B$ into analog signals, which then are freed of sampling carrier components by the post-filters 61PFC$_R$ and 61PFC$_B$ playing the role of a Nyquist filter, before being supplied to the analog encoder 62.

Figure 2:
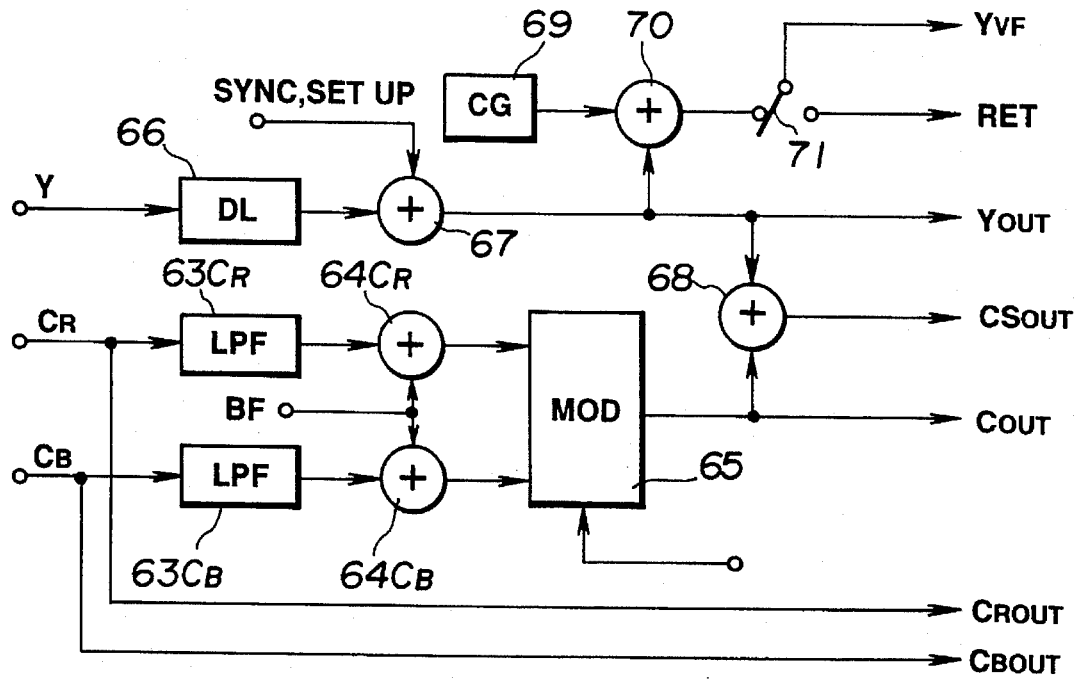
FIG. 2 is a block diagram showing an illustrative example of a signal processing section for an analog output in the digital cam corder shown in FIG. 1.

The analog encoder 62 is an encoder conforming to the usual NTSC OF PAL and is adapted for outputting component signals Y, $C_R$ and $C_B$ and a composite signal CS as well as for outputting a monitor signal $Y_{VF}$ to be supplied to a view finder The analog encoder 62 is constructed as shown for example in FIG. 2.

In the analog encoder 62, the two analog color difference signals $C_R$ and $C_B$, supplied from the D/A converting unit 61, are bandwidth-limited to a predetermined bandwidth, with fc being approximately equal to 1 MHz, by low-pass filters 63$C_R$ and 63$C_B$, and added to by a burst flag BF by signal synthesizers 64$C_R$ and 64$C_B$ before being supplied to a modulator 65. The modulator 65 modulates a quadrature 2-phase subcarrier SC by the analog color difference signals $C_R$ and $C_B$ for generating a modulated chroma signal $C_{OUT}$.

On the other hand, the analog luminance signal Y, supplied by the D/A converter 61, is compensated for delay caused by the low-pass filters 63$C_R$ and 63$C_B$ by a delay circuit 66, and subsequently added to by a synchronizing signal and a setup signal by signal synthesizer 67 to form a prescribed luminance signal $Y_{OUT}$. The luminance signal $Y_{OUT}$, produced in this manner, is improved in resolution by digital processing corresponding to the above-mentioned spatial pixel shifting method, while containing only little aliasing distortion components.

The luminance signal $Y_{OUT}$ and the above-mentioned modulated chroma signal $C_{OUT}$ are mixed by a signal mixer for generating a composite signal $CS_{OUT}$.

On the other hand, the luminance signal $Y_{OUT}$ is mixed with character signals from a character generator 69 by a signal mixer 70 and subsequently the mixed signal is outputted via a changeover circuit 71 as a monitoring signal $Y_{VF}$. The changeover circuit 71 performs switching between a return signal RET entered from outside and the above-mentioned luminance signal $Y_{OUT}$.

Figure 3:
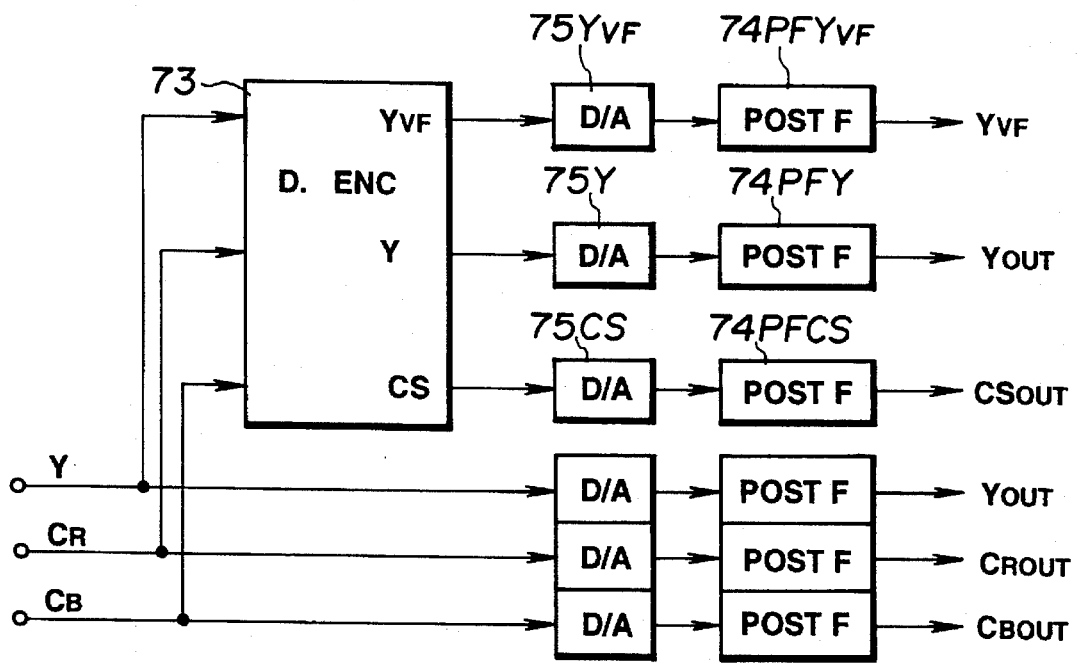
FIG. 3 is a block diagram showing another illustrative example of a signal processing section for an analog output in the digital cam corder shown in FIG. 1.

The signal processing unit for analog output 6 may also be so designed that a digital encoder 73, as shown in FIG. 3, by a third digital processing unit operated with a clock rate related with the rate equal to $f_{s1}$ is employed in place of the analog encoder 62. The digital luminance signal $Y_{OUT}$, digital composite signal $CS_{OUT}$ and the digital monitoring signal $Y_{VF}$, outputted by the digital encoder 73, may be converted into analog signals by D/A converter 74Y, 74CS and 75$Y_{VF}$ so as to be outputted via post-filters 74PFY, 74PFC$_S$ and 75PFY$_{VF}$.

With the present embodiment, the second digital processing unit 5 performs bidirectional rate conversion between signals having a data rate related to the rate of $f_{s1}$ and signal s having a data rate related to the rate of $f_{s2}$ and, as a principle, performs conversion from the digital luminance signal Y ($2f_{s1}$), having the data rate equal to $2f_{s1}$, into the digital luminance signal Y ($f_{s2}$), having the data rate equal to $f_{s2}$ and from the digital color difference signals $C_R$ ($f_{s1}$) and $C_B$ ($f_{s1}$) having the rate equal to $f_{s1}$ into digital color difference signals $C_R$ ($f_{s2}/2$) and $C_B$ ($f_{s2}/2$) having the rate equal to $f_{s2}/2$, for the recording mode. The second digital processing circuit 5 performs conversion from the digital luminance signal Y ($f_{s2}$), having the data rate equal to $f_{s2}$, into the digital luminance signal Y ($2f_{s1}$), having the data rate equal to $2f_{s1}$, and from the digital color difference signals $C_R$ ($f_{s2}/2$) and $C_B$ ($f_{s2}/2$) having the rate equal to $f_{s2}/2$ into digital color difference signals $C_R$ ($f_{s1}$) and $C_B$ ($f_{s1}$) having the rate equal to $f_{s1}$, for the playback mode. For simplifying the construction of the rate conversion circuits 50Y, 50C, the digital luminance signal Y ($f_{s2}$), having the data rate equal to $f_{s2}$, are converted into the digital luminance signal Y ($2f_{s2}$), having the data rate equal to $2f_{s2}$, while the digital color difference signals $C_R$ ($f_{s2}/2$) and $C_B$ ($f_{s2}/2$), having the rate equal to $f_{s2}/2$, are converted into the digital color difference signals $C_R$ ($f_{s2}$) and $C_B$ ($f_{s2}$) having the rate equal to $f_{s2}$, for the playback mode.

The clock rate used in the D/A converting unit 61 is also changed over to $2f_{s2}$, $f_{s2}$ and $f_{s2}$. Since the frequencies $f_{s1}$ and $f_{s2}$ are rather close to each other, the post-filters 61PRY, 61PFC$_R$ and 61PFC$_B$ may be used in common without changing their characteristics.

As for the word length, a word length of the order of 10 bits suffices for signals Y, $C_R$ and $C_B$ of the digital interface and the D/A converter 61 . However, the word length for the signals Y, $C_R$ and $C_B$ to be supplied to the second digital processing unit 5 needs to be set to a value one or two bits longer in view of the rounding errors brought about in the rate converting circuit.

In the present embodiment, 11-bit signals Y, $C_R$ and $C_B$ are generated by the first digital processing unit 4 and upper 10 bits of the signals Y, $C_R$ and $C_B$ are supplied to the D/A converter 61. The second digital processing unit 5 performs processing with a number of bits two to three bits larger and rounding to 10 bits is performed at an end stage.

Concrete examples of the rate converting circuit 50Y for luminance signals and the rate converting circuit 50C for color difference signals 50C, making up the above-mentioned second digital processing unit 5, are explained.

Figure 4:
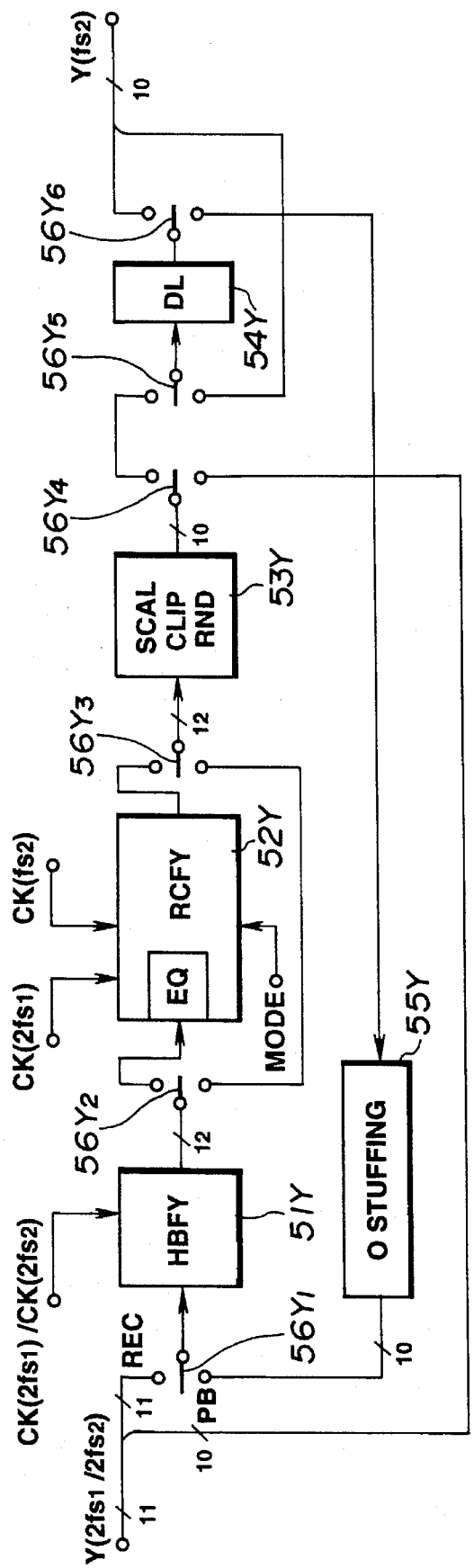
FIG. 4 is a block diagram showing an illustrative example of a rate converting circuit for luminance signals in the digital cam corder shown in FIG. 1.
Figure 5:
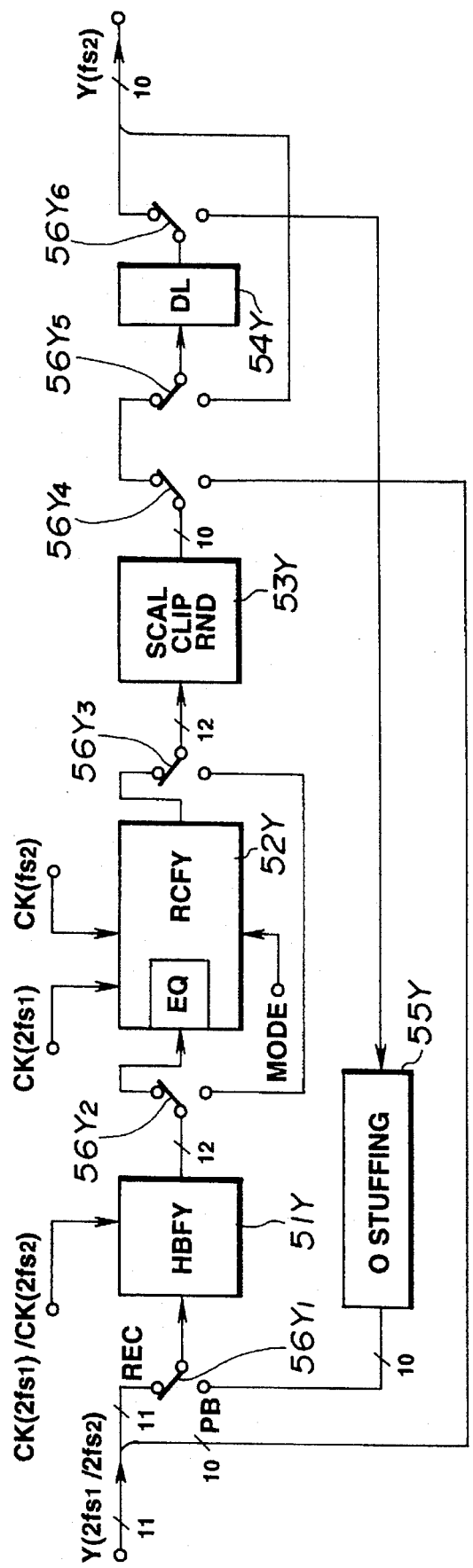
FIG. 5 is a block diagram showing the state of connection for a recording mode of the rate converting circuit for luminance signals.

The rate converting circuit 50Y for luminance signals is made up of a half bandfilter 51Y, a rate conversion filter 52Y, a rounding circuit 53Y, a delay compensating circuit 54Y, a zero-stuffing circuit 55Y and first to sixth changeover circuits 56$Y_1$ to 56$Y_6$ for changing oven the input and the output, as shown in FIG. 4.

For the recording mode, the digital luminance signals Y ($2f_{s1}$) having the rate $2f_{s1}$, generated by the first digital processing unit 4, are entered to the half-band filter 51Y so as to be sequentially passed through the rate conversion filter 52Y, rounding circuit 53Y and the delay compensating circuit 54Y, so as to be rate-converted into digital luminance signals Y($f_{s2}$) having the data rate equal to $f_{s2}$, as shown in FIG. 3.

The half band filter 51Y has a passband of $f_{s2}/2$ for the digital luminance signals Y ($2f_{s1}$) pertaining to the rate $2f_{s1}$, at an output data rate of $2f_{s1}$. Thus the half band filter has characteristics of functioning as a Nyquist filter for the rate equal to $f_{s2}$. In the present embodiment, the characteristics are so set that 0±0.1 dB (~5.75 MHz), <−12 dB (~6.75 MHz), <−40 dB (8.0 MHz).

On the other hand, the rate converting filter 52Y suppresses 1st to (n-1)th order carrier components of the higher order carrier components contained in the digital luminance signals Y ($2f_{s1}$) having the rate $2f_{s1}$ supplied via the half band filter 51Y. The rate converting filter 52Y includes an equalizing filter operated at the rate equal to $2f_{s1}$ for compensating the attenuation produced in the above-mentioned band of the half band filter 51Y.

The digital luminance signals Y ($f_{s2}$), produced by the rate converting filter 52Y, are processed by the rounding circuit 53Y with scaling, clipping and Founding and subsequently processed with delay compensation with respect to the color difference signal channel by the delay compensation circuit 54 before being outputted.

It is noted that the rate converting circuit 50Y for luminance signals performs rate conversion of from 2 m to n for a frequencies $f_{s2}=f_{s1} \cdot n/m$, where m and n are positive integers. For coping with a system in which plural $f_{s1}$ rates exist, depending on the number of pixels of the EIA/CCIR OF CCD image sensors, plural rate conversion rates may be variably set, as shown in Table 1, so that the operation may be made with plural modes.

TABLE 1

| modes | relation between $f_{s1}$ and $f_{s2}$ | $f_{s1}(f_H)$ | $f_{s2}(f_H)$ | rate conversion ratio |
|---|---|---|---|---|
| mode 0 | $f_{s2} = \frac{33}{35} f_{s1}$ | 14.31818 MHz ($910 f_H$) | 13.58 MHz ($858 f_H$) | 70→33 |
| mode 1 | $f_{s2} = \frac{18}{19} f_{s1}$ | 14.25 MHz ($912 f_H$) | 13.58 MHz ($858 f_H$) | 19→9 |
| mode 2 | $f_{s2} = \frac{12}{13} f_{s1}$ | 14.625 MHz ($936 f_H$) | 13.58 MHz ($858 f_H$) | 13→6 |
| general formula | $f_{s2} = \frac{n}{m} f_{s1}$ | | | 2m→n |

It is necessary for the rate conversion circuit 50Y to change the characteristics and operation of the rate conversion responsive to the respective modes. However, since the values of $f_{s1}$ are closer for the respective modes, the half band filter 51Y may have common characteristics, while it is only necessary to change the characteristics and operation of the rate conversion filter 52Y.

Figure 6:
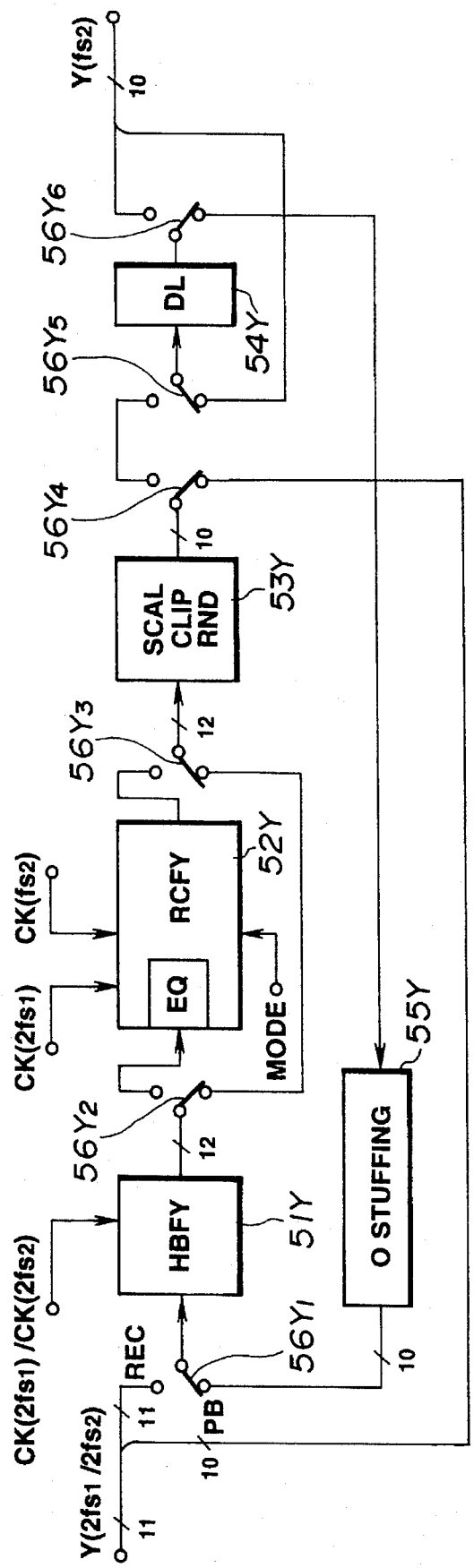
FIG. 6 is a block diagram showing the state of connection for a playback mode of the rate converting circuit for luminance signals.

Also, for the playback mode, the rate converting circuit 50Y for luminance signals has its first to sixth changeover circuits $56Y_1$ to $46Y_6$ set as shown in FIG. 6.

That is, for the playback mode, the $f_{s2}$ rate digital luminance signals Y ($f_{s2}$) reproduced by the recording/replay unit 7 are supplied to the delay compensation circuit 54Y for delay compensation with respect to the color difference signal channel before being outputted via 0-stuffing circuit 55Y to the half band filter 51Y.

The 0 stuffing circuit 55Y inserts 0s between samples for up-conversion of the digital luminance signals Y ($f_{s2}$) having the rate equal to $f_{s2}$ to the rate of $2f_{s2}$. For the replay mode, the half band filter plays the role of a rate-raising converting filter of raising the frequency from $f_{s2}$ to $2f_{s2}$ by suppressing odd-number order carrier components for the digital luminance signals Y ($f_{s2}$) having the rate equal to $2f_{s2}$.

The digital luminance signals Y($f_{s2}$) having the data rate equal to $2f_{s2}$ produced by the half band filter 51Y are processed by the rounding circuit 53Y with scaling, clipping and rounding before being outputted.

Meanwhile, the rate converting filter 52Y is not employed for replay.

Figure 7:
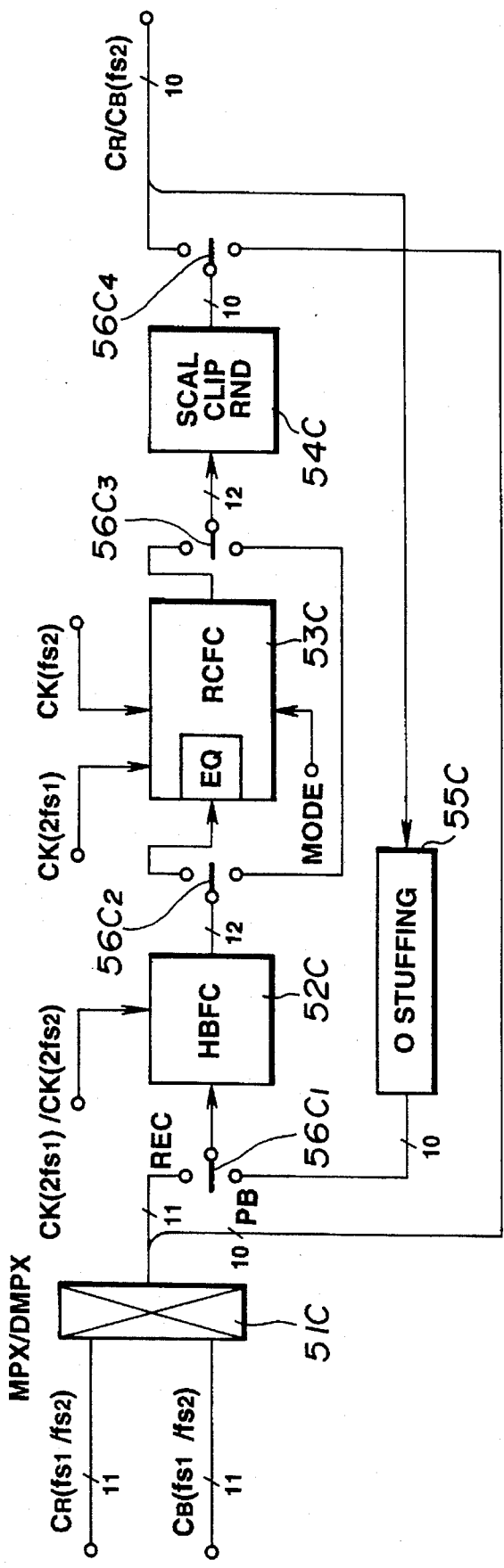
FIG. 7 is a block diagram showing an illustrative example of a rate converting circuit for color difference signals in the digital cam corder shown in FIG. 1.

The rate converting circuit 50C for color difference signals is made up of a multiplexor/demultiplexor (MPX/DMPX) 51C, a half band filter 52C, a rate converting filter 53C, a rounding circuit 54C, a 0-stuffing circuit 55C and first to fourth changeover circuits $56C_1$ to $56C_4$, as shown in FIG. 7.

Figure 8:
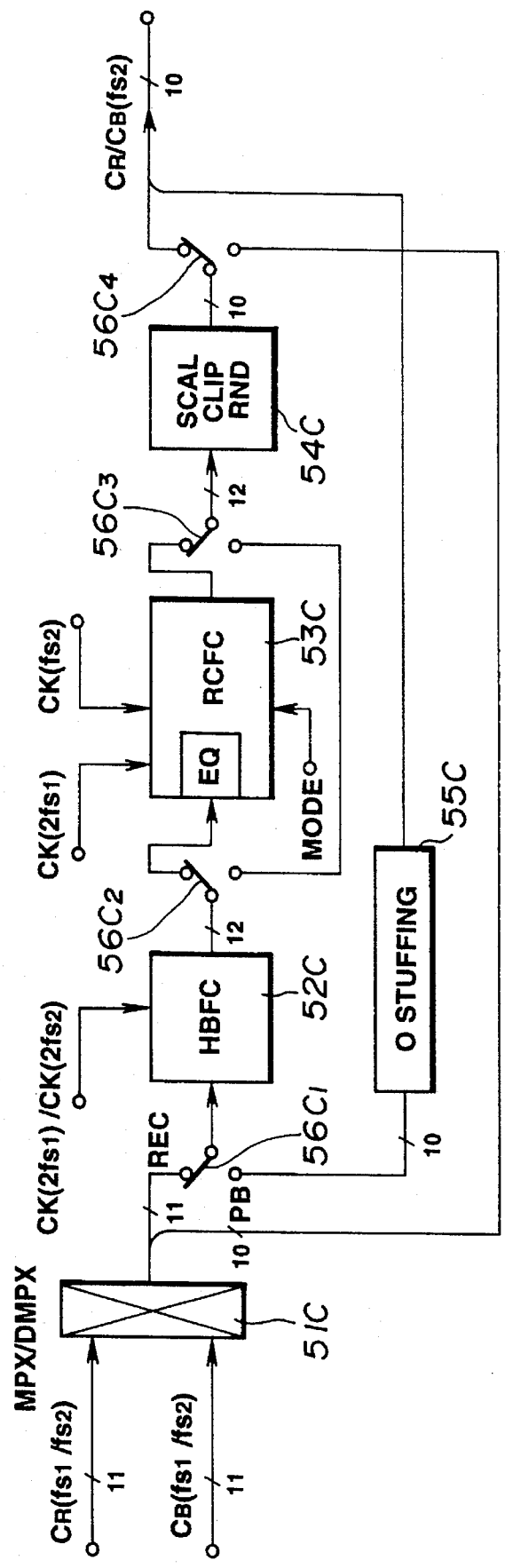
FIG. 8 is a block diagram showing the state of connection for a recording mode of the rate converting circuit for color difference signals.

For the recording mode, the rate conversion circuit 50C has its first to fourth changeover circuits $56C_1$ to $56C_4$ set as shown in FIG. 8.

That is, for the recording mode, the $f_{s1}$ rate digital color difference signals $C_R$ ($f_{s1}$), $C_B$ ($f_{s1}$), generated by the first digital processing unit 4, are arrayed in a point-sequential manner by the multiplexor/demultiplexor (MPX/DFPX) 51C, so as to be entered as the $2f_{s1}$ rate digital point-sequential color difference signals $C_R/C_B$ ($2f_{s1}$) to the half band filter 52C. The digital point-sequential color difference signals are passed through the rate converting filter 53C and the rounding circuit 54C, in this order, so as to be outputted as the $f_{s2}$ rate digital point-sequential color difference signals $C_R/C_B$ ($f_{s2}$).

The half band filter 52C has a passband of $f_{s2}$ for the digital point-sequential color difference signals $C_R/C_B$ ($2f_{s1}$), at an output data rate of $2f_{s1}$. Thus the half band filter has characteristics of functioning as a Nyquist filter for the rate equal to $f_{s2}$.

On the other hand, the rate converting filter 53C suppresses the 1st to (n-1)th order carrier components of the higher order carrier components contained in the digital luminance signals $C_R/C_B$ ($2f_{s1}$) with the rate $2f_{s1}$, supplied via the half band filter 52C. The rate converting filter 53C includes an equalizing filter operated at the rate equal to $2f_{s1}$ for compensating the attenuation produced in the above-mentioned band of the half band filter 52C.

The digital point-sequential $f_{s2}$ rate for the digital point-sequentially color difference signals $C_R/C_B$ ($f_{s2}$), produced by the rate converting filter 53C, are processed by the rounding circuit 54C with scaling, clipping and rounding before being outputted.

It is noted that the rate converting circuit 50C performs rate conversion of from 2 m to n for frequencies $f_{s2}=f_{s1} \cdot n/m$, where m and n are positive integers. For coping with a system in which plural $f_{s1}$ rates exist, depending on the number of pixels of the EIA/CCIR or CCD image sensors, plural rate conversion rates may be variably set so that the operation may be made with plural modes.

It is necessary for the rate conversion circuit 50C to change the characteristics and operation of the rate conversion responsive to the respective modes. However, since the values of $f_{s1}$ are closer for the respective modes, the half band filter 52C may have common characteristics, while it is only necessary to change the characteristics and operation of the rate conversion filter 53C.

Figure 9:
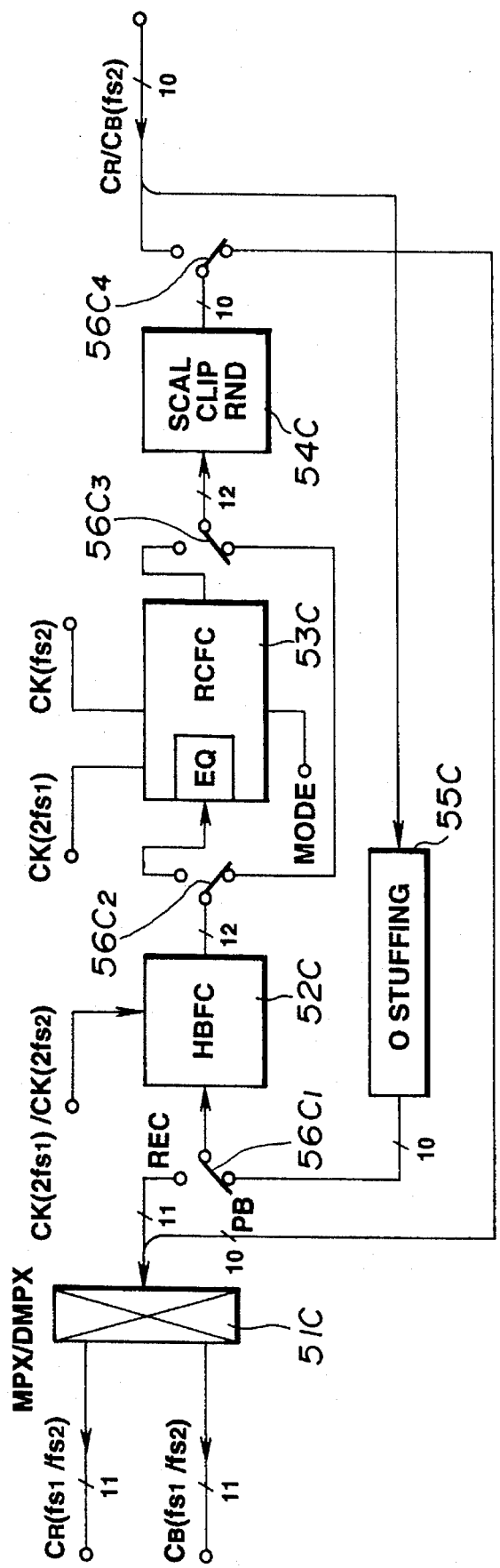
FIG. 9 is a block diagram showing the state of connection for a playback mode of the rate converting circuit for color difference signals.
Figure 10A:
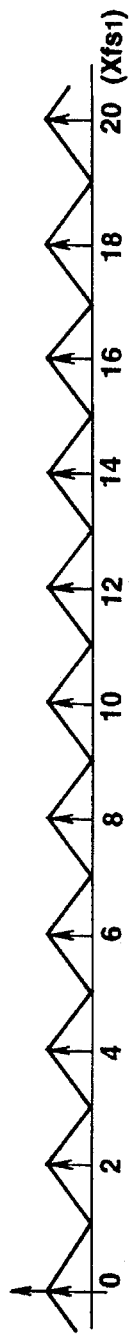
Figure 10B:
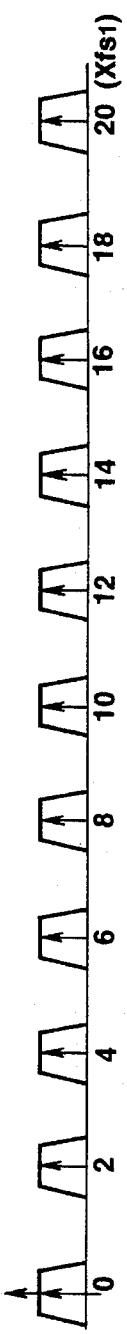
Figure 10C:
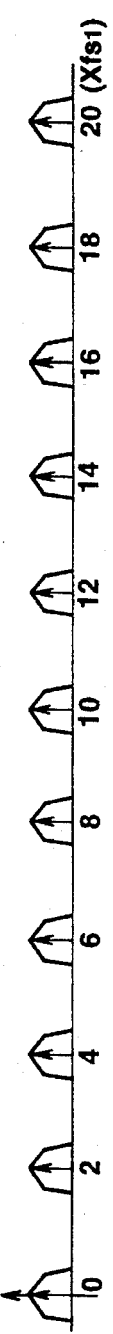
Figure 10D:
Figure 10E:
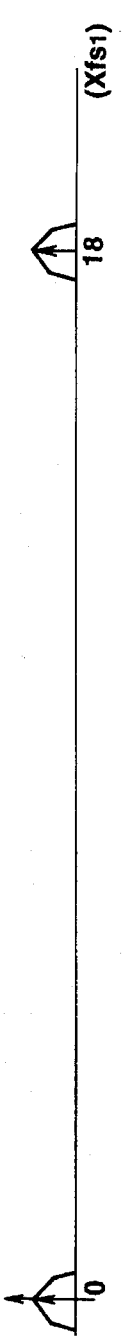
Figure 10F:
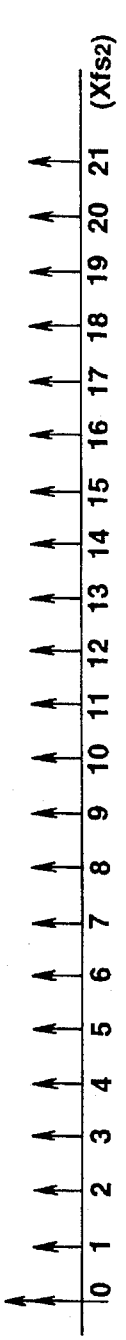
Figure 10G:
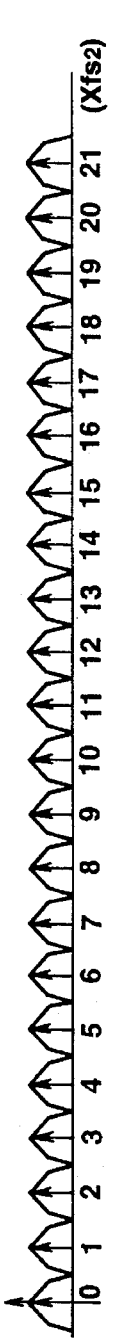
Figure 10H:
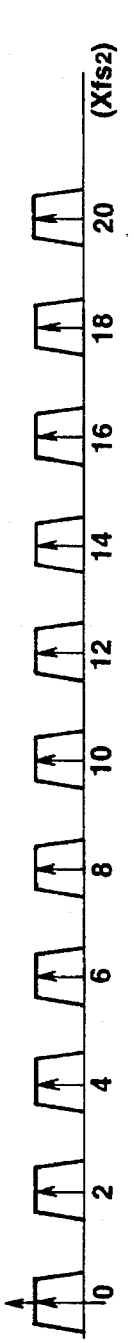
Figure 10I:
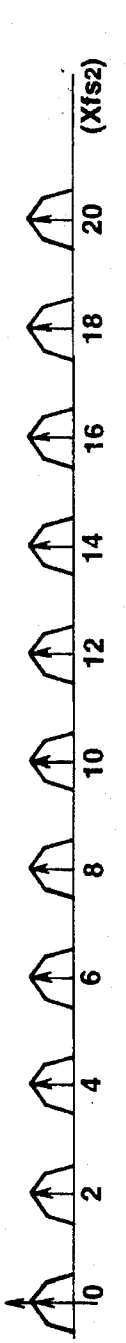

Also, for the playback mode, the rate converting circuit 50C for luminance signals has its first to fourth changeover circuits $56C_1$ to $56C_4$ set as shown in FIG. 9.

That is, for the playback mode, the $f_{s2}$ rate digital point-sequential color difference signals $C_R/C_B$ ($f_{s2}$) reproduced by the recording/replay unit 7 are supplied via 0-stuffing circuit 55C to the half band filter 52C.

The 0 stuffing circuit 55C inserts 0s between samples for up-conversion of the digital point-sequential color difference signals $C_R/C_B$ ($f_{s2}$) to the rate of $2f_{s2}$. For the replay mode, the half band filter 52C plays the role of a rate-raising converting filter of raising the frequency from $f_{s2}$ to $2f_{s2}$ by suppressing odd-number order carrier components for the $2f_{s2}$ rate digital point-sequential color difference signals $C_R/C_B$ ($f_{s2}$).

The $2f_{s2}$ rate digital point-sequential color difference signals $C_R/C_B$ ($2f_{s2}$), produced by the half band filter 52C, are processed by the rounding circuit 54C with scaling, clipping and rounding and arrayed into concurrent signals by the MPX/DMPX 51C before being outputted as $f_{s1}$ rate digital color difference signals $C_R$ ($f_{s1}$) and $C_B$ ($f_{s1}$).

Meanwhile, the rate converting filter 53C is not employed for the playback mode.

In this manner, the rate converting circuit 50C for color difference signals handles the $f_{s1}$ rate digital color difference signals $C_R$ ($f_{s1}$) and $C_B$ ($f_{s1}$) as the $2f_{s1}$ rate digital point-sequential color difference signals $C_R/C_B$, so that the hardware may be diminished in scale, while it becomes possible to use the processing of the same nature for the two color difference signals.

Meanwhile, in the present embodiment, in an output stage of the luminance signal channel of the second digital processing circuit 42 in the above-mentioned digital processing unit 4, a delay compensation circuit 42DLY is provided in a luminance signal channel.

The delay compensation circuit 42DLY is used for compensating the delay caused in the low-pass filters $63C_R$, $63C_B$ of the analog encoder 62 in the signal processing unit for analog output 6. The delay quantity of the delay compensation circuit 42DLY is so set that, if only the component signals Y, $C_R$ and $C_B$ from the signal processing unit 6 are used, the delay compensation circuit is used for compensating the delay caused in the post-filters 61PFY, $61PFC_R$ and $61PFC_B$ of the D/A converting unit 61 and, if the component signals Y, $C_R$ and $C_B$ are not used but the composite signal CS or Y/C is used, the delay compensation circuit is used for compensating the delay of the low-pass filters $63C_R$, $63C_B$ of the analog encoder 62.

Meanwhile, the difference in delay between the post filter 61PRY and the post filters $61PFC_R$ and $61PFC_B$ is usually of a small value on the order of one or two clocks based on the $f_{s1}$ rate and may be corrected at any location in the processing system.

Besides, in the present embodiment, the respective delay quantities are so set that, with the delay quantity of each of the low-pass filters $63C_R$ and $63C_B$ of the analog encoder 62 equal to $DL_{LPF}$, the delay quantity of a delay compensation circuit 66 thereof being $DL_0$, the delay quantity of the delay compensation circuit 42DLY provided at the output stage of the luminance signal channel of the first digital processing unit 4 being $DL_1$, the delay quantities of the half band filter 52Y, rate converting filter 53Y and the delay compensation circuit 54Y of the rate converting circuit 50Y for the luminance signals being $DL_2$, $DL_3$ and DL, respectively, and with the delay quantities of the half band filter 52C and the rate converting filter 53C of the rate converting circuit 50C for the color difference signals being $DL_4$ and $DL_5$, respectively, the equations $$DL_1+DL_2+DL_3+DL=DL_4+DL_5$$

and $$DL_2+DL_0=DL_4+DL_{LPF}$$

hold for the recording and playback modes, respectively.

It is noted that the effective processing rate of the rate converting circuit 50C for color difference signals is lower than that of the rate converting circuit 50Y for luminance signals, such that the inequalities $DL_2<DL_4$ and $DL_3<DL_5$ hold.

An illustrative operation of the rate converting circuit 50Y for the luminance signals for converting the $2f_{s1}$ rate digital luminance signal Y ($2f_{s1}$) generated by the first digital processing unit 4 into $f_{s2}$ rate digital luminance signal Y ($f_{s2}$) is explained for the rate conversion ratio of from 19 to 9, that is for $f_{s2}=18f_{s1}/19$, by referring to the spectrum diagram shown in FIG. 10 and to the timing chart shown in FIG. 11.

That is, for the recording mode, the $2f_{s1}$ rate digital luminance signal Y ($2f_{s1}$) with the spectrum as shown at (A) in FIG. 10, generated by the first digital processing unit 4 (bandwidth: $0~f_{s1}$), is bandwidth-limited to the Nyquist frequency with respect to the $f_{s2}$ rate, by half-band filter 51Y having characteristics shown at (B) in FIG. 10, so as to be supplied to the rate converting filter 52Y as $2f_{s1}$ rate digital luminance signal Y ($2f_{s1}$) (bandwidth: $0~f_{s2}/2$).

That is, the digital luminance signal Y ($2f_{s1}$), constituted by a set of samples $\{a_n\}$ with the rate equal to $2f_{s1}$, shown at (A) in FIG. 11, is bandwidth-limited by the half band filter 51Y to the Nyquist frequency with respect to the $f_{s2}/2$ rate, so as to be supplied to the rate converting filter 52Y.

For the set of samples $\{b_n\}$, having the $2f_{s1}$ input rate, the rate converting filter 52Y divides the interval between neighboring samples into nine equal parts, and causes the original samples to remain at points where the samples $\{b_m\}$ exist, shown by 0 at (B) in FIG. 11, while stuffing 0 samples at points where the samples $\{b_m\}$ are absent, as indicated by dots at B in FIG. 11, for transforming the sample set into a set of samples $\{b_p\}$ having a rate of $9 \times 2f_{s1}=18f_{s1}$. The rate converting filter 52Y also generates a $18 f_{s1}$ rate interpolated samples by taking a convolution of the impulse response $\{h_p\}$ of the rate converting filter represented by the $18 f_{s1}$ rate and the sample set having the $18f_{s1}$ rate. Meanwhile, an imaginary interpolated sample set by the rate converting filter 52Y and an output sample set having the $f_{s2}$ rate $\{c_n\}$ are indicated by x and ⊙, at (B) in FIG. 11, respectively.

The rate converting filter 52Y has characteristics in which, as defined at (D) in FIG. 10, it has a passband of $k \times 18f_{s1} \leq f_c$, k being an integer, and a stop band of $g \times 18f_{s1} \pm f_c$, g being an integer. Thus the rate converting filter 52Y inhibits the $2f_{s1}$ sampling carrier components in the vicinity of $2f_{s1}$ and 4 to 16 $f_{s1}$ of the $2f_{s1}$ rate digital luminance signals Y($2f_{s1}$) supplied from the half band filter 51Y, indicated at (C) in FIG. 10. In this manner, the $2f_{s1}$ rate digital luminance signal Y ($2f_{s1}$) are turned into digital luminance signal Y ($18f_{s1}$), raised to a rate nine times as much as the original rate, or $18f_{s1}$ rate.

The bandwidth characteristics of the digital luminance signals Y ($18f_{s1}$) represent the $f_{s2}$ rate Nyquist characteristics as defined by the half band filter 51Y.

It should be noted that the filtering to the $18f_{s1}$ rate is imaginary and in effect an output sample set $\{c_n\}$ having the rate equal to $f_{s2}$ produced by down-sampling the $18f_{s1}$ rate output sample train for every 19 samples.

Therefore, the convolution between the $18f_{s1}$ rate impulse response $\{h_p\}$ and the $18f_{s1}$ rate sample set $\{b_p\}$ needs to be carried out for the case of the sample train $\{b_p\}$ being non-zero sample train $\{b_m\}$, such that it suffices to carry out the processing operations of $$c_0 = h_{-9} b_1 + h_0 b_0 + h_9 b_{-1}$$
$$c_1 = h_{-8} b_3 + h_1 b_2 + h_{10} b_1$$
$$c_2 = h_{-7} b_5 + h_2 b_4 + h_{11} b_3$$
$$c_3 = h_{-6} b_7 + h_3 b_6 + h_{12} b_5$$
$$c_4 = h_{-5} b_9 + h_4 b_8$$
$$c_5 = h_{-4} b_{11} + h_5 b_{10}$$
$$c_6 = h_{-12} b_{14} + h_{-3} b_{13} + h_6 b_{12}$$
$$c_7 = h_{-11} b_{16} + h_{-2} b_{15} + h_7 b_{14}$$
$$c_8 = h_{-10} b_{18} + h_{-1} b_{17} + h_8 b_{16}$$

These processing operations may be carried out at e.g. the $f_{s1}$ rate or at the $f_{s2}$ rate.

In the above-mentioned rate converting operations by the rate converting circuit 50Y, the following three conditions are characteristically critical.

First condition: That the $2f_{s1}$ rate digital luminance signal Y ($2f_{s1}$), supplied to the half band filter 51Y, shown at (A) in FIG. 10, has the same characteristics as those of the $18f_{s1}$ rate digital luminance signals Y($18f_{s1}$), shown at (E) in FIG. 10, rate-raised by the rate converting filler 52Y to the $18f_{s1}$ rate which is imaginarily nine times as much as the original rate, as long as the bandwidth of from 0 to $f_c$ is concerned, that is that the bandwidth of 0 to $f_c$ of the characteristics of the product of the characteristics of the half band filter 51Y shown at (B) in FIG. 10 and those of the rate converting filter 52Y shown at (D) in FIG. 10 may be approximated to unity.

Second Condition: That $2f_{s1}$ sampling carrier components of the digital luminance signals Y($18f_{s1}$), rate-raised to $18f_{s1}$ rate, shown at (E) in FIG. 10, be suppressed sufficiently, as long as the range of from $f_c$ to ($18f_{s1}-f_c$) is concerned, that is that the characteristics of the product of the characteristics of the half band filter 51Y shown at (B) in FIG. 10 and the characteristics of the rate converting filter 52Y shown at (B) in FIG. 10 may be approximated to 0 as long as the range of from $f_c$ to ($18f_{s1}-f_c$) is concerned, above all that the characteristics of the rate converting filter 52Y shown at (D) in FIG. 10 becomes 0 as long as the range of from $2f_{s1}$ to $16f_{s1}$ is concerned and no ($\alpha 2f_{s1}-\beta f_{s2}$) component is generated at the output when the input is the direct current, and further that the characteristics of the product of the characteristics of the half band filter 51Y shown at (B) in FIG. 10 and those of the rate converting filter 52Y shown at (D) in FIG. 10 be sufficiently suppressed as long as the range of from $1f_{s2}$ to $18f_{s2}$ is concerned.

Third Condition: That the filter characteristics of the rate converting circuit 50Y be so set that the frequency characteristics in the vicinity of $f_c$ of the digital luminance signal Y ($18f_{s1}$) shown at (E) in FIG. 10, raised in rate to imaginarily to nine times as much as the original frequency, or to $18f_{s1}$ rate, by the rate converting filter 52Y, be within a prescribed value range.

With the rate converting circuit 51 of the present embodiment, the $2f_{s1}$ rate digital luminance signal Y ($2f_{s1}$) is first passed through the half band filter 51Y to satisfy the first and the second conditions, while the third condition may be satisfied by the rate converting filter 52Y. Besides, since the half band filter 51Y is an FIR filter having a fixed coefficient, the circuit size may be reduced by employing various filter designing methods. The rate converting filter 52Y, which is a variable coefficient filter, necessitates a multiplier. However, it may be constructed easily because it has smooth roll-off characteristics and subjected to only little constraint concerning the stop band, as shown at (D) in FIG. 10.

For example, the impulse response $\{h_p\}$ of the rate converting filter 52Y may be expressed by 24 orders of $$\{1, 3, 6, 10, 15, 21, 28, 35, 43, 49, 54, 57, 58, 57 \ldots \}/78$$

while three of the multipliers of the rate converting filter 52Y suffice. The word length of the coefficient becomes 6 bits in his case to simplify the coefficient generator or the multiplier.

The rate converting filter 52Y of the rate converting circuit 51 may be constructed as shown for example in FIG. 12.

The rate converting filter 52Y shown in FIG. 12 executes the above-mentioned processing operations at the output rate of $f_{s2}$ to generate a sample train or set $\{c_n\}$ of the $f_{s2}$ rate from the sample train $\{b_n\}$ of the $2f_{s1}$ rate. Thus it is made up of four-stage shift registers 151, a data re-arraying circuit 152, latch circuits 153A, 153B and 153C, three coefficient generators 154A, 154B and 154C, multipliers 155A, 155B and 155C, an adder 156 and a latch circuit 157.

The sample train $\{b_n\}$ of the $2f_{s1}$ rate, shown at (A) in FIG. 13, is supplied in series to the shift register 151 of the rate converting filter 52Y. The shift register 151 is operated by the $2f_{s1}$ rate clocks CK ($2f_{s1}$) for sequentially delaying the sample train $\{b_n\}$ of the $2f_{s1}$ rate. A 1-clock delay output, a 2-clock delay output, a 3-clock delay output, and a 4-clock delay output, shown at (B), (C), (D) and (E) in FIG. 13, of the sample train $\{b_n\}$, produced by the four-stage shift register 151, are supplied in parallel to the data re-arraying circuit 152, at the $2f_{s1}$ rate.

The data re-arraying circuit 152 re-arrays at the $f_{s2}$ rate the 1-clock delay output, 2-clock delay output, 3-clock delay output and the 4-clock delay output, entered in parallel from the shift register 151 at the $2f_{s1}$ rate, for generating three different sample trains $\{b_n\}_A$, $\{b_n\}_B$ and $\{b_n\}_C$ employed for the above processing operations, as shown at (F), (G) and (H) in FIG. 13. The $f_{s2}$ rate sample trains $\{b_n\}_A$, $\{b_n\}_B$ and $\{b_n\}_C$, generated by the data re-arraying circuit 152, are supplied via the latch circuits 153A, 153B and 153C to the multipliers 154A, 154B and 154C.

On the other hand, the coefficient generators 155A, 155B and 155C sequentially generate the three different multiplication coefficients $A_{COEF}$, $B_{COEF}$ and $C_{COEF}$, employed for the above-mentioned processing operations. Of these coefficient generators 155A, 155B and 155C, the coefficient generator 155A sequentially supplies the multiplication coefficients $A_{COEF}$ $\{h_{-9}, h_{-8}, h_{-7}, h_{-6}, h_{-5}, 0, h_{-12}, h_{-11}$ and $h_{-10}\}$, as shown at (I) in FIG. 13, to the multiplier 154A. The coefficient generator 155B sequentially supplies the multiplication coefficients $B_{COEF}$ $\{h_0, h_1, h_2, h_3, h_4, h_{-4}, h_{-3}, h_{-2}$ and $h_{-1}\}$, as shown at (J) in FIG. 13, to the multiplier 154B, while the coefficient generator 155C sequentially supplies the multiplication coefficients $C_{COEF}$ $\{h_9, h_{10}, h_2, h_{11}, h_{12}, 0, h_5, h_6, h_7$ and $h_8\}$, as shown at (K) in FIG. 13, to the multiplier 154C.

The multipliers 154A, 154B and 154C perform an operation of parallel multiplication of multiplying the latch outputs of the latch circuits 153A, 153B and 153C, that is the $f_{s2}$ rate sample trains $\{b_n\}_A$, $\{b_n\}_B$ and $\{b_n\}_C$, generated by the data re-arraying circuit 152, by the different multiplication coefficients $A_{COEF}$, $B_{COEF}$ and $C_{COEF}$ supplied from the coefficient generators 155A, 155B and 155C, at the $f_{s2}$ rate. The multiplication outputs of the multipliers 154A, 154B and 154C are supplied to the adder 156.

The adder 156 adds the multiplication outputs of the multipliers 154A, 154B and 154C to calculate the $f_{s2}$ rate sample trains $\{c_n\}$, that is $$c_0 = h_{-9} b_1 + h_0 b_0 + h_9 b_{-1}$$

$$c_1 = h_{-8}b_3 + h_1b_2 + h_{10}b_1$$

$$c_2 = h_{-7}b_5 + h_2b_4 + h_{11}b_3$$

$$c_3 = h_{-6}b_7 + h_3b_6 + h_{12}b_5$$

$$c_4 = h_{-5}b_9 + h_4b_8$$

$$c_5 = h_{-4}b_{11} + h_5b_{10}$$

$$c_6 = h_{-12}b_{14} + h_{-3}b_{13} + h_6b_{12}$$

$$c_7 = h_{-11}b_{16} + h_{-2}b_{15} + h_7b_{14}$$

$$c_8 = h_{-10}b_{18} + h_{-1}b_{17} + h_8b_{16}$$

The $f_{s2}$ rate sample trains $\{c_n\}$, generated from the $2f_{s1}$ rate sample trains $\{b_n\}$, are sequentially outputted via latch circuit 157, as shown at (M) in FIG. 13.

For the present concrete example of $f_{s2} = 18f_{s1}/19$, it suffices to cause the multiplication coefficients $A_{COEF}$, $B_{COEF}$ and $C_{COEF}$, employed for the above-mentioned processing operations, to appear cyclically at the interval of nine clocks of $f_{s2}$, so that the coefficient generators 155A, 155B and 155C may be easily arranged as shift registers, as shown for example in FIG. 14.

The coefficient generator 155, shown in FIG. 14, is made up of first to third shift registers 161, 162 and 163, connected in tandem, a first switching circuit 164 for changing over the clocks of the shift registers 161, 162 and 163, a second switching circuit 165 for changing over the outputs and a control circuit 166 for controlling the operation of the switching circuits 164, 165.

Each of the first to third shift registers 161 to 163 has its clock input terminal selectively connected via the first switching circuit 164 to first or second clock input terminals 160A or 160B. Besides, the first shift register 161 has its data input terminal selectively connected via the second switching circuit 165 to a data output terminal of the first shift register 161, a data output terminal of the second shift register 162, a data output terminal of the third shift register 163 or a coefficient data input terminal 160C. The first shift register 161 is a six-stage shift register having its data output terminal connected to the coefficient data output terminal 155C. The second shift register 162 and the third shift register 163 are three-stage and 24-stage shift registers, respectively.

The first clock input terminal 160A is supplied with $f_{s2}$ rate clocks CK ($f_{s2}$). The second clock input terminal 160B is supplied with load clocks LDCKI from a system controller, not shown. The coefficient data input terminal 160C is supplied with coefficient data COEFI from the system controller, while the control circuit 166 is supplied from the synchronizing signal generator 11 with a horizontal synchronizing signal HD from the synchronizing signal generator 11, while being supplied with a mode signal MODEI from the system controller.

In the present coefficient generator 155, the switching circuits 164 and 165 are controlled in the following manner by the control circuit 166 responsive to the mode signal MODEI supplied from the system controller, not shown.

That is, when starting the camera operation, the first switching circuit 164 selects the load clock LDCKI supplied from the system controller. During the normal operation, the first switching circuit 164 selects the $f_{s2}$ rate clock CK($f_{s2}$).

When starting the camera operation, the second switching circuit 165 selects the coefficient data COEFI supplied from the system controller. During the normal operation, the second switching circuit 165 selects output data of the first to third shift registers 161 to 163, that is, it selects the output data of the first shift register 161, the output data of the second shift register 162 or the output data of the third shift register 163 for the modes 1, 2 and 3, respectively, With the above-described arrangement of the coefficient generator 155, the coefficient data COEFI required for rate conversion at the desired rate conversion ratio is supplied, at the time of starting the camera, from the system controller to the data input terminal of the shift register SR1 via the second switching circuit 165 for synchronized writing at the required stage numbers of the first to third shift registers 161 to 163 by the load clocks LDCK for setting the coefficient data COEFI having the desired conversion ratio in the first to third shift registers 161 to 163.

For the normal operation, the coefficient data as set in the first to third shift registers 161 to 163 are recycled responsive to the operating mode by clocks CK ($f_{s2}$) at the $f_{s2}$ rate for real-time outputting of the multiplication coefficient COEFI required for rate conversion at the desired rate conversion ratio.

That is, for mode 1, by recycling the coefficient data COEFI as set in the first shift register 161 at the $f_{s2}$ rate by the clocks CK ($f_{s2}$), wherein, according to the equation $f_{s2} = 12f_{s1}/13$, the multiplication coefficient COEF necessary for rate conversion at the rate conversion ratio of from 13 to 6 is outputted.

For mode 2, by recycling the coefficient data COEFI as set in the first shift register 161 and the second shift register 162 at the $f_{s2}$ rate by the clocks CK ($f_{s2}$), wherein, according to the equation $f_{s2} = 18 f_{s1}/19$, the multiplication coefficient COEF necessary for rate conversion at the rate conversion ratio of from 19 to 9 is outputted.

For mode 3, by recycling the coefficient data COEFI as set in the first shift register 161, second shift register 162 and in the third shift register 163 at the $f_{s2}$ rate by the clocks CK ($f_{s2}$), wherein, according to the equation $f_{s2} = 33f_{s1}/35$, the multiplication coefficient COEF necessary for rate conversion at the rate conversion ratio of from 70 to 33 is outputted.

The coefficient generator 155 may be constructed by a random access memory 171, an address control circuit 172, a control circuit 173 etc., as shown in FIG. 15.

In the coefficient generator 155, shown in FIG. 15, the control circuit 173 performs the following control operations responsive to the mode signal MODEI supplied from the system controller, not shown.

That is, when starting the camera, the address control circuit 172 is controlled for generating write addresses responsive to load clocks LDCK supplied from the system controller, not shown, while controlling the random access memory 171. During the normal operation, the control circuit 173 controls the address control circuit 172 for generating the readout addresses responsive to the $f_{s2}$ rate clocks CK ($f_{s2}$), while controlling the readout of the random access memory 171.

When starting the camera, the coefficient data COEFI, necessary for rate conversion at the desired rate conversion ratio is written from the system controller, not shown, in the random access memory 171 via the control circuit 173. During the normal operation, the coefficient data COEFI as set in the random access memory 171 is repeatedly read at the $f_{s2}$ rate by the clocks CK ($f_{s2}$), while the multiplication coefficient COEF required for rate conversion at the desired rate conversion ratio is outputted on the real-time basis via the latch circuit 174.

On the other hand, the rate conversion circuit 50C for color difference signals in the present embodiment handles digital color difference signals $C_R(f_{s1})$ and $C_B(f_{s1})$, having the rate equal to $f_{s1}$, as $2f_{s1}$ rate digital point-sequential color difference signals $C_R/C_B$, as mentioned above. Similarly to the rate conversion circuit 50Y for luminance signals, the rate converting circuit 50C for the above-mentioned luminance signals performs the rate conversion of from 2 m to n with the frequencies given by $f_{s2}=f_{s1} \cdot n/m$, with m and n being positive integers, as shown in timing charts of FIGS. 16 and 17, showing the operation for the rate conversion ratio of $f_{s2}=18f_{s1}/19$, that is from 19 to 9.

The rate conversion filter 53C for the rate conversion circuit 50C for color difference signals may be constructed similarly to the rate conversion filter 52Y for the rate conversion circuit 50Y for luminance signals. Thus, as shown in FIG. 18, the rate conversion filter 53C is made up of a four-stage shift register 251, a data re-arraying circuit 252, latch circuits 253A, 253B and 253C, three multipliers 254A, 254B and 254C, coefficient generators 255A, 255B and 255C, an adder 256 and a latch circuit 257, as shown in FIG. 18.

The coefficient generators 255A, 255B and 255C of the rate conversion filter 53C may be made up of first to third shift registers 261, 262 and 263, connected in tandem, a first switching circuit 264 for changing over the clocks of the shift registers 261, 262 and 263, a second switching circuit 265 for changing over the outputs and a control circuit 266 for controlling the operation of the switching circuits 264, 265, as shown in FIG. 19, or of a random access memory 271, an address control circuit 272 and a control circuit 273 etc., as shown in FIG. 20.

Since the operation of the rate conversion filter is the same as that of the rate converting filter 52Y for luminance signals, the corresponding operation is not made for brevity.

It will be noted that, in the rate converting operation indicated by $n \times 2f_{s1}=mf_{s2}$, such as rate conversion of from 19 to 9 for m=19 and n=9, the $2f_{s1}$ rate input data set has a large energy at a frequency an integer number 1~(n−1) of times of $2f_{s1}$. Thus it suffices for the rate converting filter performing the rate conversion to have filter characteristics which will suppress the carrier components of these frequencies and higher-order carrier side band frequencies. Thus the rate conversion filter needs to have an impulse response of an integer number coefficient given by developing a product $H_1(z^{-1}) \times H_2(z^{-1})$ of a first transfer function $H_1(z^{-1})$ having a zero point at the frequency $n \times 2f_{s1}$ and a second transfer function $H_2(z^{-1})$ having zero points above and below the frequency $n \times 2f_{s1}$.

That is, it is possible for the rate converting filter 52Y for luminance signals to have an impulse response of an integer coefficient having at least one zero point at $n \times 2f_{s1}$ and two zero points in the vicinity thereof, while it is possible for the rate converting filter 53C for color difference signals to have an impulse response of an integer coefficient having at least one zero point at $n \times f_{s1}$ and two zero points in the vicinity thereof.

The first and second transfer functions $H_1(z^{-1})$ and $H_2(z^{-1})$ may for example be given by the following equations:

$$H_1(z^{-1}) = \sum_{p=0}^{n-1} z^{-p} \quad \text{(equation 1)}$$

$$H_2(z^{-1}) = \left\{ \sum_{p=0}^{n-1} z^{-p} \right\}^2 - H_0(z^{-1}) \quad \text{(equation 2)}$$

The first transfer function $H_1(z^{-1})$ has an (n−1)th order integer coefficient and is given for example by $$H_1(z^1) = 1+z^{-1}+z^{-2}+z^{-3}+z^{-4}+z^{-5}+z^{-6}+z^{-7}+z^{-8}.$$

The second transfer function $H_2(z^{-1})$ has an 2(n−1)th order integer coefficient and is given for example by $$\begin{aligned}
H_1(z^{-1}) &= 1 + 2z^{-1} + 3z^{-2} + 4z^{-3} + 5z^{-4} + 6z^{-5} + \\
&\quad 7z^{-6} + 8z^{-7} + 9z^{-8} + z^{-16} + 2z^{-15} + \\
&\quad 3z^{-14} + 4z^{-13} + 5z^{-12} + 6z^{-11} + 7z^{-10} + \\
&\quad 8z^{-9}) - (z^{-7} + 2z^{-8} + z^{-9}) \\
&= 1 + 2z^{-1} + 3z^{-2} + 4z^{-3} + 5z^{-4} + 6z^{-5} + \\
&\quad 7z^{-6} + 7z^{-7} + 7z^{-8} + 7z^{-9} + 7z^{-10} + \\
&\quad 6z^{-11} + 5z^{-12} + 4z^{-13} + 3z^{-14} + \\
&\quad 2z^{-15} - (z^{-16})
\end{aligned}$$

whereby the rate conversion filter has a 3nth order integer coefficient and has characteristics as shown in FIG. 21. Meanwhile, $z^{-1}$ is a unit delay operator corresponding to $n \times 2f_{s1}$.

With the data string entered to the rate converting filter, since real samples are present at an interval of n with respect to the impulse response of the rate converting filter, three multipliers suffice for performing an actual convolution. By operating the rate converting filter only for suppressing high carrier components of $2f_{s1}$, the number of the multipliers necessary for the actual circuit may be diminished. Although the roll-off of the amplitude characteristics becomes blunt in the vicinity of the base band, it may be corrected in advance by the half band filter.

With the above-described digital cam corder, the image pickup signals R, G and B outputted from the solid-state image sensors 1R, 1G and 1B of the image pickup unit 1 driven at the $f_{s1}$ rate are digitized at the $f_{s1}$ rate at the predetermined phase by the A/D converting unit 3, and at least the digital luminance signals Y and the two digital color difference signals $C_R$ and $C_B$ are generated by the first digital processing unit 4 operated at a clock rate related with the $f_{s1}$ rate, so that digital picture signals having an excellent picture quality may be obtained without suffering from beat interference.

For the recording mode, as shown in FIG. 22 showing the operating state during recording, the $f_{s1}$ rate related digital luminance signals Y and the two digital color difference signals $C_R$ and $C_B$, generated by the first digital processing unit 4, are converted by the second digital processing unit 5 into $f_{s2}$ rate related digital luminance signals Y and two digital color difference signals $C_R$, $C_B$ so as to be supplied to the recording/reproducing unit 7, while the $f_{s1}$ rate related digital luminance signals Y and the two digital color difference signals $C_R$, $C_B$ are outputted via the signal processing unit 6 for analog output 6. Also, as shown in FIG. 23 showing the operating state during the playback mode, the $f_{s2}$ rate related digital luminance signals Y and the two digital color difference signals $C_R$, $C_B$, reproduced by the recording/reproducing unit 7 are converted by the second digital processing unit 5 into $f_{s1}$ rate related digital luminance signals Y and the two digital color difference signals $C_R$ and $C_B$ so as to be outputted via the signal processing unit for analog output 6.

That is, with the present digital cam corder, the second digital processing unit 5 has the function of bidirectional rate conversion between the $f_{s1}$ rate related data rate and the $f_{s2}$ rate related data rate. Thus, for the recording mode, the second digital processing unit 5 outputs the digital luminance signals Y and the two digital color difference signals $C_R$ and $C_B$, generated by the first digital processing unit 4, via the signal processing unit 6, while supplying the same signals to the recording/reproducing unit 7 via the second digital processing unit 5. For the playback mode, the second digital processing unit 5 supplies the $f_{s2}$ rate related data rate signals Y, $C_R$ and $C_B$, reproduced by the recording/reproducing unit 7, to the signal processing unit 6 via the second digital processing unit 5, while outputting playback signals via the signal processing unit 6, so that the $f_{s2}$ rate related data rate signals Y, $C_R$ and $C_B$ may be recorded and/or reproduced by the recording/reproducing unit 7.

Besides, with the present digital cam corder, the second digital processing unit 5 may set plural rate conversion ratio, the input data signals Y, $C_R$ and $C_B$ related to the $f_{s1}$ rate are converted to the output data signals Y, $C_R$, and $C_B$ related to the $f_{s2}$ rate. So that, by employing the standard CCD image sensor as CCD image sensor 1R, 1G and 1B of the image pick-up unit 1, the digital imaging signal at D-1 standard clock rate or other clock rate may be obtained.

On the other hand, with the present digital cam corder, the first digital processing unit 4 generates the $2f_{s1}$ rate digital luminance signals Y ($2f_{s1}$), while the second digital processing unit 5 performs rate conversion of from $2f_{s1}$ to $f_{s2}$ on the digital luminance signals Y ($2f_{s1}$), for the recording mode. Besides, for the playback mode, the second digital processing unit performs the rate conversion of from $f_{s2}$ to $2f_{s1}$ or to $2f_{s2}$ on the $f_{s2}$ rate digital luminance signals supplied from the recording/reproducing unit 7, so that it becomes possible to simplify the construction of the second digital processing unit.

On the other hand, the second digital processing unit 5 operates for the recording mode at the clock rates of $2f_{s2}$, $f_{s2}$ and $f_{s2}$ to play the role of a Nyquist filter for the signals Y($2f_{s1}$), $C_R$ ($f_{s1}$) and $C_B$ ($f_{s1}$), with the clock rates of $f_{s2}/2$, $f_{s2}/4$ and $f_{s2}/4$. For the playback mode, the second digital processing unit 5 operates at the clock rates of $2f_{s1}$, $f_{s1}$ and $f_{s1}$, so that the half bandfilters 51Y, 52C having the same frequency characteristics as those during the recording mode is employed for both the playback and recording modes. Thus, during the recording mode, the second digital processing unit 5 processes the signals Y($2f_{s1}$), $C_R$ ($f_{s1}$) and $C_B$ ($f_{s1}$), supplied from the rate converting filters 52Y and 53C via the half band filters 51Y and 52C, by performing the rate conversion of from $2f_{s1}$ to $f_{s2}$ on the digital luminance signals Y ($2f_{s1}$), and by performing the rate conversion of from $f_{s1}$ to $f_{s2}/2$ on the digital color difference signals $C_R$ ($f_{s1}$) and $C_B$ ($f_{s1}$). The construction of the second digital processing unit 5 may be simplified in this manner by employing the half band filters 51Y and 52C in common for the playback and recording modes.

Besides, the second digital processing unit 5 limits the bandwidth of the input data rate signals Y, $C_R$ and $C_B$, generated by the first digital processing unit 5, by half band filters 51Y and 52C, having $f_{s2}/2$, $f_{s2}/4$ and $f_{s2}/4$ as the passbands, with the output data rate of $2f_{s1}$, $f_{s1}$ and $f_{s1}$, and performs rate conversion of from $2f_{s1}$ to $f_{s2}$, $f_{s1}$ to $f_{s2}/2$ or $f_{s2}/4$ and from $f_{s1}$ to $f_{s2}/2$ or $f_{s2}/4$ to output the low-order linear phase finite impulse response sufficient to suppress high order sideband components in the vicinity of $n \times 2f_{s1}$, $n \times f_{s1}$ and $n \times f_{s1}$, n being a positive integer, in the downsampled form of $f_{s2}$, $f_{s2}/2$ or $f_{s2}/4$ and $f_{s2}/2$ or $f_{s2}/4$. The pass roll-off characteristics of the rate converting filters 52Y, 53C may also be compensated by the characteristics of the half band filters 51Y and 52C. This enables the rate conversion to be executed reliably by the second digital processing unit 5 of a simplified construction.

Besides, with the present digital cam corder, the rate converting filters 52Y and 53C for effecting rate conversion of the signals bandwidth-limited by the half band filters 51Y and 52C have an impulse response of an integer coefficient having at least one zero point at $n \times 2f_{s1}$, $n \times f_{s1}$ and $n \times f_{s1}$, and two zero points in the vicinity thereof, so that these filters may each be constructed by three multipliers 154A to 154C and 254A to 254C.

Besides, the half band filters 51Y, 52C for bandwidth limiting the input data rate signals Y, $C_R$ and $C_B$, generated by the first, digital processing unit 4, may be of a simplified structure comprising products of partial filters constituted by integer coefficients.

With the present digital cam corder, the output image pick-up signals R, G and B of the solid-state image sensors 1R, 1G and 1B, arranged in the color-separating optical system of the image pickup unit 1 constructed in accordance with the spatial pixel shifting method, are digitized by the A/D converting unit 3 at the predetermined phase at the $f_{s1}$ rate. At least the $f_{s1}$ rate digital luminance signals Y ($2f_{s1}$) and two $f_{s1}$ rate $C_R$ ($f_{s1}$) and $C_B$ ($f_{s1}$) are generated by the first digital processing unit 4, and rate conversion of from 2 m to n, where m and n are positive integers, is performed by the second digital processing unit 5 capable of setting plural rate conversion ratios n/m for generating digital luminance signals Y ($f_{s2}$) having the rate of $f_{s2}=f_{s1}$∎n/m and digital color difference signals $C_R$ ($f_{s2}/2$) and $C_B$ ($f_{s2}/2$) having substantially the $f_{s2}/2$ rate, In this manner, high quality high MTF digital picture signals free of beat interference and aliasing distortion components may be produced in accordance with the spatial pixel shifting method.

With the present digital cam corder, the signals Y ($2f_{s1}$) and $C_R$ ($f_{s1}$) and $C_B$ ($f_{s1}$), generated by the first digital processing unit 4, are converted into analog signals by the D/A converting unit 61 of the signal processing unit 6 to output analog luminance signals $Y_{OUT}$ and analog color difference signals $C_{ROUT}$ and $C_{BOUT}$, so that high resolution analog picture signals and high MTF digital picture signals with little aliasing distortion components may be produced simultaneously. The signal processing unit 6 converts the $2f_{s1}$ rate digital luminance signals Y ($2f_{s1}$), generated by the first digital processing unit 4, into output analog signals by the D/A converting unit 61 for the recording mode, while converting the $2f_{s2}$ rate digital luminance signals Y ($2f_{s2}$), generated by the second digital processing unit 5, into output analog signals by the D/A converting unit 61 for the playback mode, so that high resolution analog luminance signals may be obtained for both the recording and playback modes.

With the above-described second digital processing unit 5, the digital luminance signal Y is interfaced by the digital interface 13 at the clock rate of $2f_{s2}$ and the digital color difference signals $C_R$ and $C_B$ are interfaced by the digital interface 13 at the clock rate of $f_{s2}/2$, so that the $2f_{s2}$ rate digital luminance signals Y ($2f_{s2}$) and the $f_{s2}/2$ clock rate digital color difference signals $C_R$ ($f_{s2}/2$) and $C_B$ ($f_{s2}/2$) may be exchanged with external equipment.

With the present digital cam corder, the first delay compensation circuit 42DLY for compensating the group delay caused by low-pass filters 63, 64 adapted for bandwidth-limiting the analog color difference signals in the analog encoder 62 supplied with analog luminance signals and analog color difference signals converted by the D/A converter 61 of the signal processing unit 6 from the signals Y, $C_R$ and $C_B$ generated by the first digital processing unit 4 is provided at the output stage of the luminance signal channel of the second digital processing circuit 42 of the first digital processing unit 4, so that the differential delay between the luminance signal Y and the color difference signals $C_R$ and $C_B$ generated by the CCD image sensors 1R, 1G and 1B of the image pickup unit 1 may be compensated to assure high quality analog picture signals.

With the present digital cam corder, since the second delay compensating circuit 54Y for outputting the $f_{s2}$ rate related output data rate signals Y, $C_R$ and $C_B$ generated by the second digital processing unit 5 with an equalized group delay is provided in the rate converting circuit 50Y for luminance signals of the second processing unit 5, the differential delay between the luminance signal Y and the color difference signals $C_R$ and $C_B$ generated by the CCD image sensors 1R, 1G and 1B of the image pickup unit 1 may be compensated to assure high quality analog picture signals.

Besides, with the present digital cam corder, since the second digital processing unit 5 has the function of bidirectional rate conversion between the $f_{s1}$ rate related data rate and the $f_{s2}$ rate related data rate, and generates $f_{s2}$ rate related data rate digital luminance and digital color difference signals, entered from the second delay compensation circuit 54Y during external input mode, and the $f_{s1}$ rate related output data rate signals Y, $C_R$ and $C_B$, having the same group delay as that of the signals Y, $C_R$ and $C_B$, outputted from the first digital processing unit 4, to supply the generated signals to the A/D converting unit 61 of the signal processing unit 6, the differential delay between the luminance signal Y and the color difference signals $C_R$ and $C_B$ may be compensated even during the external input mode to assure high quality analog picture signals.

With the solid-state image pickup apparatus according to the present invention, the picture signals outputted from at least one solid-state image sensor driven at the $f_{s1}$ rate are digitized at the $f_{s1}$ rate at a predetermined phase by a predetermined A/D converting unit and at least the digital luminance signals Y and two digital color chrominance signals $C_R$ and $C_B$ are generated from the digitized pickup data by the first digital processing unit operated at the $f_{s1}$ related clock rate, so that high quality picture signals free of beat interference may be produced. Besides, since the $f_{s1}$ related input data rate signals Y, $C_R$ and $C_B$ are converted by the second digital processing unit into signals Y, $C_R$ and $C_B$ having the $f_{s2}$ related output data rate, the digital picture signals having the D-1 standard clock rate or other clock rate may be produced using a standard CCD image sensor.

With the solid-state image pickup apparatus according to the present invention, the second digital processor performs bandwidth limitation of the input data rate signals Y, $C_R$ and $C_B$, generated by the first digital processing unit, at the output data rate of $2f_{s1}$, $f_{s1}$ and $f_{s1}$, by half band filters having the passbands of $f_{s2}/2$, $f_{s2}/4$ and $f_{s2}/4$, while performing the rate conversion of from $2f_{s1}$ to $f_{s2}$, $f_{s1}$ to $f_{s2}/2$ or $f_{s2}/4$ and from $f_{s1}$ to $f_{s2}/2$ or $f_{s2}/4$ for outputting the low order linear phase finite impulse response to suppress the high order sideband component in the vicinity of $n\times 2f_{s1}$, $n\times f_{s1}$ and $n\times f_{s1}$, n being a positive integer, in the down-sampled form at $f_{s2}$, $f_{s2}/2$ or $f_{s2}/4$, $f_{s2}/2$ or $f_{s2}/4$. Besides, the bandpass roll-off characteristics of the rate converting filter are compensated by the characteristics of the half-band filter. This enables the rate conversion operation to be performed reliably by the second digital processing unit of a simplified construction.

In the solid-state image pickup apparatus according to the present invention, the rate converting filter for performing the rate conversion on the signals limited in bandwidth by the half band filters has an impulse response of an integer coefficient having at least one zero point $n\times 2f_{s1}$, $n\times f_{s1}$ and $n\times f_{s1}$ and two zero points in the vicinity thereof, and may be constructed by a plurality of multipliers.

In the solid-state image pickup apparatus according to the present invention, the half band filter for bandwidth-limiting the input data rate signals Y, $C_R$ and $C_B$, generated by the first digital processing unit, may be constructed in a simple manner by the product of partial filters constructed by integer coefficients.

In addition, with the solid-state image pickup apparatus according to the present invention, since the image pickup signals, outputted from plural solid-state image sensors, arranged in the color-separating optical system in accordance with the spatial pixel shifting method so as to be driven at the $f_{s1}$ rate, are digitized by the A/D converting unit at the $f_{s1}$ rate, at a predetermined phase, the digital luminance signals Y ($2f_{s1}$) having the rate $2f_{s1}$ and the digital color difference signals $C_R$ ($f_{s1}$) and $C_B$ ($f_{s1}$) having the rate equal to $f_{s1}$ are generated by the first digital processing unit so as to be processed by the second digital processing unit with rate conversion of from m to n, where m and n are positive integers, for generating the digital luminance signal Y ($f_{s2}$) having the rate of $f_{s2}=f_{s1}\cdot n/m$ and the $f_{s2}/2$ clock rate digital color difference signals $C_R$ ($f_{s2}$) and $C_B$ ($f_{s2}$), so that high TMF high quality digital picture signals may be generated without producing beat interference.

What is claimed is:

1. A solid-state image pickup apparatus comprising:

a solid-state image sensor for providing image pickup signals at a predetermined data rate of $f_{s1}$, analog-to-digital converting means coupled to said solid-state image sensor for digitizing said image pickup signals at a clock rate equal to $f_{s1}$ for outputting digital image pickup signals, first digital processing means supplied with said digital image pickup signals for providing at least a digital luminance signal having a data rate equal to $2f_{s1}$ and two digital color difference signals each having a data rate equal to $f_{s1}$, recording/reproducing means interfaced with a clock rate related to $f_{s2}$, second digital processing means coupled to said first digital processing means and said recording/reproducing means, said second digital processing means converting the data rate of said digital luminance signal supplied from said first digital processing means to a data rate equal to $f_{s2}$ for outputting a rate-converted digital luminance signal to said recording/reproducing means for the recording mode.

2. A solid state image pickup apparatus according to claim 1, further comprising a signal processing means supplied with said digital luminance signal and the two digital color difference signals for generating output signals, said second digital processing means for converting the data rate of said digital luminance signal supplied from said recording/reproducing means to a data rate equal to $2f_{s2}$ for outputting a converted digital luminance signal and supplying said rate-converted digital luminance signal to said signal processing means in a playback mode.

3. The solid-state image pickup apparatus according to claim 1, wherein said second digital processing means is operable to set a plurality of data rate conversion ratios.

4. The solid-state image pickup apparatus according to claim 1, wherein said second digital processing means comprises:

a filter functioning as a Nyquist filter for the clock rate of $f_{s2}$ on the digital luminance signals having the data rate of $2f_{s1}$, generated by said first digital processing means, for outputting digital luminance signals having a data rate of $2f_{s1}$, and a rate converting filter for performing data rate conversion of from $2f_{s1}$ to $f_{s2}$ on said digital luminance signals having a data rate of $2f_{s1}$, said filter having constant characteristics and said rate-converting filter having a variable rate-converting ratio.

5. The solid-state image pickup apparatus according to claim 2, wherein said signal processing means comprises:

digital-to-analog converting means for converting the digital luminance signal and the two digital color difference signals into an analog luminance signal and analog color difference signals, and an analog encoder supplied with said analog luminance signal and analog color difference signals generated by said digital-to-analog converting means.

6. The solid-state image pickup apparatus according to claim 5 comprising:

delay compensation means in a luminance signal channel of said first digital processing means for compensating for a group delay caused by a low-pass filter adapted for bandwidth-limiting on the analog color difference signals in said analog encoder.

7. A solid-state image pickup apparatus comprising:

a solid-state image sensor for providing image pickup signals at a predetermined data rate of $f_{s1}$, analog-to-digital converting means coupled to said solid-state image sensor for digitizing said image pickup signals at a clock rate equal to $f_{s1}$ to form digital image pickup signals, first digital processing means supplied with the digital image pickup signals from said analog-to-digital converting means for providing at least a digital luminance signal having a data rate related to $f_{s1}$ and two digital color difference signals each having a data rate related to $f_{s1}$, recording/reproducing means interfaced with a clock rate related to $f_{s2}$, second digital processing means coupled to said first digital processing means and said recording/reproducing means for converting the data rate of said digital luminance signal and the two color difference signals supplied from said first digital processing means to a data rate related to $f_{s2}$ for generating the rate-converted digital luminance signal and the rate-converted color difference signals, said second digital processing means supplying the rate-converted digital luminance signal and the rate-converted digital color difference signals to said recording/reproducing means.

8. The solid state image apparatus according to claim 7, further comprising signal processing means supplied with said digital luminance signal and the two digital color difference signals for generating output signals, wherein said second digital processing means is coupled to said recording/reproducing means for converting the data rate of the digital luminance signals and the digital color difference signals supplied thereto by said recording/reproducing means to a data rate related to $f_{s1}$ for generating the rate-converted digital luminance signals and the rate-converted digital color difference signals, said second digital processing means supplying said rate-converted digital luminance signals and said rate-converted digital color difference signals to said signal processing means.

9. The solid-state image pickup apparatus according to claim 8, wherein the digital luminance signal and the two color difference signals generated by said first digital processing means are outputted via said signal processing means and supplied via said second digital processing means to said recording/reproducing means in a recording mode, and wherein the digital luminance signal and the two digital color difference signals of a data rate related to $f_{s2}$, supplied from said recording/reproducing means, are supplied via said second digital processing means to said signal processing means in a playback mode, via which the signals supplied from said recording/reproducing means are outputted as playback signals.

10. The solid-state image pickup apparatus according to claim 8, wherein said signal processing means comprises digital-to-analog converting means.

11. The solid-state image pickup apparatus according to claim 8, wherein said first digital processing means produces the digital luminance signal having a data rate of $2f_{s1}$ and said second digital processing means performs data rate conversion of from $2f_{s1}$ to $f_{s2}$ on the digital luminance signal having the data rate of $2f_{s1}$ in a recording mode.

12. The solid-state image pickup apparatus according to claim 11, wherein said second digital processing means performs data rate conversion of from $f_{s2}$ to $2f_{s1}$ on the digital luminance signal supplied from said recording/reproducing means in a playback mode.

13. The solid-state image pickup apparatus according to claim 8, wherein said first digital processing means produces the digital luminance signal having a data rate of $2f_{s1}$ and the two digital color difference signals, each having the data rate of $f_{s1}$ in a recording mode, and wherein said second digital processing means performs data rate conversion of from $2f_{s1}$ to $f_{s2}$ on the digital luminance signal having the data rate of $2f_{s1}$ and data rate conversion of substantially from $f_{s1}$ to $f_{s2}/2$ on said two color difference signals having the data rate of $f_{s1}$.

14. The solid-state image pickup apparatus according to claim 13, wherein said second digital processing means performs data rate conversion of from $f_{s2}$ to $2f_{s1}$ on the digital luminance signal having the data rate equal to $f_{s2}$ and data rate conversion of substantially from $f_{s2}/2$ to $f_{s1}$ on the two digital color difference signals having the data rate equal to $f_{s2}/2$ in a playback mode.

15. The solid state image apparatus according to claim 7, further comprising signal processing means supplied with said digital luminance signal and the two digital color difference signals for generating output signals, wherein said second digital processing means coupled to said signal processing means and said recording/reproducing means for converting the data rate of the digital luminance signals and the digital color difference signals supplied thereto by said recording/reproducing means to a data rate related to $f_{s2}$ for generating the rate-converted digital luminance signals and the rate-converted digital color difference signals, said second digital processing means supplying said rate-converted digital luminance signals and said rate-converted digital color difference signals to said signal processing means.

16. The solid-state image pickup apparatus according to claim 15, wherein said first digital processing means produces the digital luminance signal having a data rate of $2f_{s1}$ and said second digital processing means performs data rate conversion of from $2f_{s1}$ to $f_{s2}$ on the digital luminance signal having the data rate of $2f_{s1}$ in a recording mode.

17. The solid-state image pickup apparatus according to claim 16, wherein said second digital processing means performs data rate conversion of from $f_{s2}$ to $2f_{s2}$ on the digital luminance signal supplied from said recording/reproducing means in a playback mode.

18. The solid-state image pickup apparatus according to claim 17, wherein said signal processing means comprises digital-to-analog converting means for converting, for the recording mode, the digital luminance signal having a data rate of $2f_{s1}$, produced by said first digital processing means, into analog signals, which are outputted, said digital-to-analog converting means converting, for the playback mode, the digital luminance signal having a data rate of $2f_{s2}$, produced by said second digital processing means, into analog signals, which are outputted.

19. The solid-state image pickup apparatus according to claim 15, wherein said first digital processing means produces the digital luminance signal having a data rate of $2f_{s1}$ and the two digital color difference signals, each having the data rate of $f_{s1}$ in a recording mode, and wherein said second digital processing means performs data rate conversion of from $2f_{s1}$ to $f_{s2}$ on the digital luminance signal having the data rate of $2f_{s1}$ and data rate conversion of substantially from $f_{s1}$ to $f_{s2}/2$ on said two color difference signals having the data rate of $f_{s1}$.

20. The solid-state image pickup apparatus according to claim 19, wherein said second digital processing means performs data rate conversion of from $f_{s2}$ to $2f_{s2}$ on the digital luminance signal having the data rate equal to $f_{s2}$ and data rate conversion of substantially from $f_{s2}/2$ to $f_{s2}$ on the two digital color difference signals having the data rate equal to $f_{s2}/2$ in a playback mode.

21. The solid-state image pickup apparatus according to claim 20, wherein said signal processing means comprises digital-to-analog converting means for converting, for the recording mode, the digital luminance signal having the data rate of $2f_{s1}$ and the two digital color difference signals having the data rate of $f_{s1}$, produced by said first digital processing means, into analog signals, which are outputted, said digital-to-analog converting means converting, for the playback mode, the digital luminance signal having the data rate of $2f_{s2}$ and the two digital color difference signals having the data rate of $f_{s2}$, produced by said second digital processing means, into analog signals, which are outputted.

22. The solid-state image pickup apparatus according to claim 20, wherein, said second digital processing means comprises a filter operated, for the recording mode, at a clock rate of $2f_{s1}$ and functioning as a Nyquist filter for the clock rate of $2f_{s1}$ on the digital luminance signals having the data rate $2f_{s1}$ generated by said first digital processing means, said filter being operated, for the playback mode, at clock rates of $2f_{s2}$ and $f_{s2}$ on the digital luminance signals and the digital color difference signals, respectively, and presenting the same frequency characteristics as in the recording mode, and a rate converting filter connected to said filter for performing data rate conversion of substantially from $2f_{s1}$ to $f_{s2}$ and data rate conversion of substantially from $f_{s1}$ to $f_{s2}/2$ on the digital luminance signals supplied via said filter and on the two digital color difference signals, for the recording mode, respectively, said filter being used both for the playback mode and for the recording mode.

23. A solid-state image pickup apparatus comprising:

a plurality of solid-state image sensors for providing image pickup signals at a predetermined data rate of $f_{s1}$, analog-to-digital converting means coupled to said image sensors for digitizing said image pickup signals at a clock rate equal to $f_{s1}$ for forming digital image pickup signals, first digital processing means supplied with said digital image pickup signals from said analog-to-digital converting means for providing at least a digital luminance signal having a data rate equal to $2f_{s1}$ and two digital color difference signals each having a data rate equal to $f_{s1}$, second digital processing means coupled to said first digital processing means for converting the data rate of said digital luminance signal and the two digital color difference signals from M to N, M and N being natural numbers, for providing a digital luminance signal having a data rate equal to $f_{s2}$, where $f_{s2}=2f_{s1}\cdot N/M$, and two color difference signals having a data rate substantially equal to $f_{s2}/2$, said second digital processing means having a half band filter, said half band filter having a passband in a range of from 0 to $f_{s2}/2$ for the digital luminance signal and a passband in a range of from 0 to $f_{s2}/4$ for the digital color difference signals, and a rate converting filter supplied with outputs of said half band filter for down-sampling the digital luminance signal at a data rate equal to $f_{s2}$ and for down-sampling the two color difference signals at a data rate equal to $f_{s2}/2$, for suppressing higher order sideband components close to $N\times 2f_{s1}$, N being a natural number.

24. A solid-state image pickup apparatus according to claim 1, wherein one of said image sensors is arrayed with a spatial shift equal to one-half the pixel arraying pitch with respect to the remaining image sensors.

25. A solid-state image pickup apparatus comprising:

a solid-state image sensor for providing image pickup signals at a data rate equal to $f_{s1}$, analog-to-digital converting means coupled to said solid state image sensor for digitizing said image pickup signals at a data rate equal to $f_{s1}$ at a predetermined phase to form digital image pickup signals, first digital processing means operated at a clock rate related to said data rate of $f_{s1}$ for generating, from said digital image pick-up signals, at least a digital luminance signal having a data rate related to $f_{s1}$ and two digital color difference signals having a data rate related to $f_{s1}$, second digital processing means for converting said digital luminance signal having a data rate related to $f_{s1}$ and said two digital color difference signals having a data rate related to $f_{s1}$ into a digital luminance signal having a data rate related to $f_{s2}$ and two digital color difference signals having a data rate related to $f_{s2}$, respectively, said second digital processing means having a half band filter having a passband of $f_{s2}/2$ for said digital luminance signal from said first digital processing means having a data rate related to $f_{s1}$, with the data rate being $2f_{s1}$, and a passband of $f_{s2}/4$ for said two digital color difference signals from said first digital processing means having a data rate related to $f_{s1}$, with the data rate being $f_{s1}$, and a rate converting filter for performing data rate conversion of from $2f_{s1}$ to $f_{s2}$ on the digital luminance signals supplied via said half band filter and down-sampling a low order linear phase finite length impulse response sufficient to suppress higher order sideband components in the vicinity of $n\times 2f_{s1}$, where n is a positive integer, at a down-sampling rate of $f_{s2}$ for outputting down-sampled impulse response, said rate converting filter also performing data rate conversion of from $f_{s1}$ to $f_{s2}/2$ or $f_{s2}/4$ on said two digital color difference signals supplied via said half band filter and down-sampling a low order linear phase finite length impulse response sufficient to suppress higher order sideband components in the vicinity of $n\times f_{s1}$, where n is a positive integer, at a down-sampling rate of $f_{s2}/2$ or $f_{s2}/4$ for outputting down-sampled impulse response.

26. The solid-state image pickup apparatus according to claim 25, wherein said half band filter has characteristics which compensate for roll-off characteristics of said rate converting filter.

27. The solid-state image pickup apparatus according to claim 26, wherein said rate converting filter has at least one zero point at n×2$f_{s1}$ for said digital luminance signal and at n×$f_{s1}$ for said two digital color difference signals, said rate converting filter also having each two zero points in the vicinity thereof.

28. The solid-state image pickup apparatus according to claim 25, wherein said rate converting filter comprises a plurality of multipliers.

29. The solid-state image pickup apparatus according to claim 25, wherein said half band filter comprises a product of partial filters each constituted by integer coefficients.

30. A solid state image pickup apparatus comprising:
- a plurality of solid-state image sensors for providing image pickup signals at a predetermined data rate of $f_{s1}$, at least one of said image sensors being arrayed with a spatial shift equal to one-half the pixel arraying pitch with respect to the remaining image sensors,
- analog-to-digital converting means for digitizing said image pickup signals at a clock rate equal to $f_{s1}$ for forming digital image pickup signals,
- first digital processing means supplied with said digital image pickup signals from said analog-to-digital converting means for providing at least a digital luminance signal having a data rate equal to 2$f_{s1}$ and two digital color difference signals each having a data rate equal to $f_{s1}$, and
- second digital processing means coupled to said first digital processing means for converting the data rate of said digital luminance signal and the two digital color difference signals from M to N, M and N being natural numbers, for providing a digital luminance signal having a data rate equal to $f_{s2}$, where $f_{s2}=2f_{s1}\cdot N/M$, and two color difference signals having a data rate substantially equal to $f_{s2}/2$, and
- third digital processing means coupled to said first digital processing means for processing said digital luminance signal and the two digital color difference signals to output processed signals to an external device.

31. The solid-state image pickup apparatus according to claim 30, wherein said second digital processing means includes a half band filter having a passband in a range of from 0 to $f_{s2}/2$ for the digital luminance signals and a passband in a range of from 0 to $f_{s2}/4$ for the digital color difference signals, and a rate converting filter supplied with outputs of said half band filter for down-sampling the digital luminance signal at a data rate equal to $f_{s2}$ and for down-sampling the two color difference signals at a data rate equal to $f_{s2}/2$, for suppressing higher order sideband components close to N×2$f_{s1}$, N being a natural number.

32. The solid-state image pickup apparatus according to claim 30, wherein said second digital processing means is operative to set a plurality of rate conversion ratios.

33. The solid-state image pickup apparatus according to claim 30, further comprising recording/reproducing means interfaced with said second digital processing means at a clock rate related to $fs_2$.

34. The solid-state image pickup apparatus according to claim 30, wherein said third digital processing means includes digital/analog conversion means for converting said digital luminance signal and the two digital color difference signals to an analog luminance signal and to analog color difference signals, respectively.

35. The solid-state image pickup apparatus according to claim 30, wherein said second digital processing means is operative to down-convert the data rate of said digital luminance signal and the two digital color difference signals from M to N.

* * * * *